United States Patent [19]
Davidson et al.

[11] Patent Number: 5,465,368
[45] Date of Patent: Nov. 7, 1995

[54] DATA FLOW MACHINE FOR DATA DRIVEN COMPUTING

[75] Inventors: George S. Davidson; Victor G. Grafe, both of Albuquerque, N.M.

[73] Assignee: United States Department of Energy, Washington, D.C.

[21] Appl. No.: 559,523

[22] Filed: Jul. 24, 1990

Related U.S. Application Data

[63] Continuation of Ser. No. 223,133, Jul. 22, 1988, abandoned.

[51] Int. Cl.[6] .................................................. G06F 13/00
[52] U.S. Cl. ..................... 395/800; 395/375; 364/232.22; 364/246.6; 364/931.11; 364/DIG. 1; 364/DIG. 2
[58] Field of Search ................................ 364/200, 900

[56] References Cited

U.S. PATENT DOCUMENTS

| | | | |
|---|---|---|---|
| 3,962,706 | 6/1976 | Dennis et al. | 340/172.5 |
| 4,145,733 | 3/1979 | Misunas et al. | 364/200 |
| 4,153,932 | 5/1979 | Dennis et al. | 364/200 |
| 4,591,979 | 5/1986 | Iwashita | 364/200 |
| 4,675,806 | 6/1987 | Uchida | 364/200 |
| 4,766,534 | 8/1988 | DeBenedicts | 364/200 |
| 4,809,159 | 2/1989 | Sowa | 364/200 |
| 4,841,436 | 6/1989 | Asano et al. | 364/200 |
| 4,942,517 | 7/1990 | Cok | 364/200 |
| 4,943,916 | 7/1990 | Asano et al. | 364/200 |
| 4,953,082 | 8/1990 | Nomura et al. | 364/200 |
| 4,972,315 | 11/1990 | Yamasaki et al. | 364/200 |
| 5,008,882 | 4/1991 | Peterson et al. | 370/94.3 |
| 5,053,946 | 10/1991 | Jain | 364/200 |

OTHER PUBLICATIONS

A. Plas, et al., "LAU System Architecture: A Parallel Data–Driven Processor Based On Single Assignment", *Proceedings of 1976 International Conf. On Parallel Processing*, 1976, pp. 293–302.
Arvind, et al., "A Processing Element For A Large Multiple Processor Dataflow Machine", *IEEE International Conf. On Circuits & Computers*, 1980, pp. 601–605.
J. Fisher, "The SPS–1000: A Data Flow Architecture", *Peripheral Array Processors Proceedings*, 1982, pp. 77–82.
J. Dennis et al., "Maximum Pipelining of Array Operations On Static Data Flow Machine" *International Conference On Parallel Processing*, 1983, pp. 331–334.
J. Dennis et al., "The MIT Data Flow Engineering Model", *IFIP Information Processing*, 1983.
E. Levin, "Suitability Of A Data Flow Architecture For Problems Involving Simple Operations On Large Arrays", (List continued on next page.)

*Primary Examiner*—Christopher B. Shin
*Attorney, Agent, or Firm*—Luis M. Ortiz; James H. Chafin; William R. Moser

[57] ABSTRACT

A data flow computer which of computing is disclosed which utilizes a data driven processor node architecture. The apparatus in a preferred embodiment includes a plurality of First-In-First-Out (FIFO) registers, a plurality of related data flow memories, and a processor. The processor makes the necessary calculations and includes a control unit to generate signals to enable the appropriate FIFO register receiving the result. In a particular embodiment, there are three FIFO registers per node: an input FIFO register to receive input information form an outside source and provide it to the data flow memories; an output FIFO register to provide output information from the processor to an outside recipient; and an internal FIFO register to provide information from the processor back to the data flow memories. The data flow memories are comprised of four commonly addressed memories. A parameter memory holds the A and B parameters used in the calculations; an opcode memory holds the instruction; a target memory holds the output address; and a tag memory contains status bits for each parameter. One status bit indicates whether the corresponding parameter is in the parameter memory and one status but to indicate whether the stored information in the corresponding data parameter is to be reused. The tag memory outputs a "fire" signal (signal R VALID) when all of the necessary information has been stored in the data flow memories, and thus when the instruction is ready to be fired to the processor.

4 Claims, 9 Drawing Sheets

OTHER PUBLICATIONS

*Proceedings 1984 International Conf. On Parallel Processing,* Aug. 1985, pp. 518–520.

N. Ito et al., "NEDIPS: A Non–von Neumann High–Speed Computer", *NEC Research and Development,* #78, Jul. 1985, pp. 83–90.

R. Jagannathan et al., "Eazyflow Engine Architecture", *1985 Conf. On Computers and Communications,* pp. 161–165.

V. Srini, "An Architectural Comparison of Dataflow Systems" *Computer,* Mar. 1986, pp. 68–88.

A. Bagchi, "Arrays In Static Data Flow Computers", *1986 Proceedings of IEEE Region 5 Conference,* pp. 156–195.

DATA FLOW MACHINE FOR DATA DRIVEN COMPUTING

This application is a continuation of application Ser. No. 07/223,133, filed Jul. 22, 1988, now abandoned.

BACKGROUND OF THE INVENTION

1. Field of the Invention

The present invention relates generally to data driven processing machines and methods, and in particular relates to a processor node architecture—its structure and method of programming. The Government has rights in this invention pursuant to Contract No. DE-AC04-76DP00789 awarded by the U.S. Department of Energy and AT&T Technologies Inc.

2. Description of the Prior Art

Computer architectures are being forced away from the traditional von Neumann architecture to attain the performances required to run present day large scientific codes. These new architectures require much work to map a code to effectively use the machine. Usually the problem must be explicitly partitioned among parallel processors—a difficult and time consuming task. A data driven processor, however, requires only that the programmer specify what operations must be carried out to solve the problem. The order of execution and the number of parallel processing elements participating in the execution are determined by the hardware without further direction.

In all uses of parallel processing, however, the scientific code must have a structure to compute with an array. Such codes are marked by the necessity to perform similar computations on many data items. The maximum parallelism is obtained in any machine by completely unfolding the program loops that process the arrays. This has the disadvantage of requiring a separate copy of the code for each iteration in the loop, which produces a significant penalty when dealing with loops that may run for thousands of passes. It is more advantageous to have only a few copies of a loop code and process different data through them.

In evaluating any array model, or system architecture, the commonly understood approach is to view the arrays as streams. The loop processing is then structured as a pipeline with one element of the stream in each stage of the pipeline. Each stage of the pipeline sends a "next" signal to the previous stage to indicate that it is ready for the next data items.

For example, an array processor can solve the following multiple, dependent step problem:

$$C_i = A_i + B_i \tag{1}$$

$$E_i = C_i * D_i \tag{2}$$

One series of processors solves equation (1) and each processor outputs the answer $C_i$ to a corresponding processor in a second series of processors, usually in response to a request (i.e, a "next" signal) for that $C_i$. Simultaneously the corresponding processor requests the next D and uses the $D_i$ corresponding to $C_i$ to solve equation (2). The $E_i$ values then appear at the output in order. The input values of $A_i$, $B_i$, and $D_i$ values are fed into the pipeline also in order. One of the few ways to obtain more parallelism is by having several copies of the pipeline, which requires more memory in exchange for more parallelism to exploit. This approach, however, can not be used in all situations. For example, this approach fails when the output data values are each a function of all of the input data values, which is the case when solving a system of equations.

The implementation of arrays as streams forces a sequential evaluation of the array elements (in the order they appear in the stream). This prevents a machine using this model of arrays from exploiting the inherent spatial concurrency available in many array operations. By contrast, vector machines are specifically optimized to take advantage of this spatial concurrency and realize most of their performance gains from this feature alone.

It has been proposed in Bagchi, "Arrays in Static Data Flow Computers", 1986 *Proceedings of IEEE Region 5 Conference* that data flow computers include traditional vector or array processors to exploit spatial concurrency. Such an inclusion would allow such concurrency to be exploited, but at the expense of the "purity" of the data flow model of computation. Corrupting the computing model in this manner would severely complicate the task of programming the machine due to the mixed models, and would also degrade the ability of a data flow machine to exploit fine grain parallelism everywhere in a problem. Exactly when to use the array processor and when to use the data flow processors is unclear, and efficient compilers for such a hybrid machine would be difficult if not impossible. A number of functional units is set apart for array computations, complicating the hardware design.

A similar array model (traditional control flow model) without the vector processors was discussed in Levin, "Suitability of a Data Flow Architecture for Problems Involving Sizable Operations on Large Arrays;" *Proceedings 1984 Int'l Conference on Parallel Processing*, pp. 518–520, (August 1985). Once again the machine was a hybrid of data flow and control flow models, resulting in many of the complications discussed above. In addition, the complication of the computing model including control flow array models made it difficult to provide enough array storage for the problem being studied. It also slowed the transfer of data between the models of computation.

Data flow architectures to date have addressed arrays in one or more of three ways: not at all, as streams, or as control flow "patches" to the data flow model. All three of these approaches have obvious shortcomings as described above. An array model is needed which is consistent with a data flow computing model and is able to exploit spatial concurrency.

However, a full appreciation of the problem must consider the basic architecture of data flow machines (DFM) and control flow machines (CFM). Data driven processing differs from control flow processing in many important ways. The design of a data driven processor is simpler than a control flow processor. The data driven processor is able to more effectively utilize pipelined execution. It is easier to specify the solution technique ("program") for a data driven processor—especially for parallel processing. The data storage is viewed differently in a data driven machine. Perhaps most importantly, a data driven machine is able to exploit more of the parallelism in a problem than can a traditional control flow machine. A more complete description of data driven computing theory may be found in the following: J. B. Dennis, "Data Flow Computation;" *In Control Flow and Data Flow: Concepts of Distributed Programming*, Springer-Verlag, 1985; and K. P. Gostelow and R. E. Thomas, "Performance of a Simulated Dataflow Computer;" *IEEE Transactions on Computers*, C-29(10):905–919, October 1980, incorporated hereby by reference.

In traditional control flow processing the order of instruction execution is determined by a program counter. Each instruction is fetched from memory and decoded; data memory references are resolved and the operation performed; and the result is stored in memory. Differences in memory access times and inter-processor communication times can lead to varying minimum instruction times, complicating the processor design and limiting its sustained performance.

The architecture of a Data Flow Machine, on the other hand, uses the availability of data (rather than a program counter) to schedule operations. Once all the required parameters have been routed to an operation, all are automatically fed into the execution pipeline. The memory performs what was the control flow processor's fetching of instructions. Instructions are not "fetched" until all the data is ready, and thus there is never any wait time for memory access or interprocessor communication times. The "fetching" of an instruction sends the instruction together with all of its parameters to the execution pipeline. The machine's execution pipelines therefore stay full and operate at their maximum clock frequency as long as there are ready instructions anywhere in the program. The processor design is simplified since there is no memory system control or communication protocol within the processor.

The order of instruction execution on a control flow machine must be specified exactly. The code implementing an algorithm must ensure that data required by any instruction is current (i.e., all necessary previous computations have been done). This introduces extra work into the translation of the problem to its solution on the machine because now the machine must be told not only how to calculate the results but also when to compute them. Since data driven processing uses the availability of data to determine the order of instruction execution, the code to solve a problem does not need to specify the order of computation. The specification of how to solve the problem will give all the information required since a data driven processor can never execute an instruction before its data is ready.

Initial data and intermediate values computed in a control flow machine are stored in memory locations, and the instructions operate on the data in those storage locations. Initial data and intermediate values in a data driven machine have meaning only as they are associated with an operation. Indeed, there is no concept of a data store, only chains of operations that pass data along them.

Parallel control flow processing requires an additional specification of the location where each operation is to be done. The programmer must now dictate what operations are required to solve the problem, in what order to perform them, and which processor is used to perform them. The transmission of intermediate results between control flow processors must also be explicitly done by the programmer or the compiler. In a data driven machine the hardware and the availability of data determine where and when to perform the required operations. Communication between processors is just the direct transmission of data between operations and needs no more direction from the programmer than in a uni-processor code. Codes therefore generate the same results when run on a thousand processors as on a single processor, and the exact same code may be run. The extension to parallel processing is solely a function of the machine and has none of the complications encountered in parallel control flow programming. See, for example, Gannon et al, "On the Impact of Communication Complexity on the Design of Parallel Numerical Algorithms;" *IEEE Transactions on Computers*, C-33(12), pp. 1180–1194, (December 1984); and Kuck et al, "The Effects of Program Restructuring, Algorithm Change, and Architecture Choice On Program Performance;" *IEEE Transactions on Computers*, pp. 129–138, (January 1984) both incorporated herein by reference.

Although maintaining computation balanced among traditional control flow processors is very difficult in a data driven parallel processor, it is possible to have the load perfectly balanced among the processors since ready instructions may be executed by any available processor.

Data driven processing also exploits more of the parallelism present in a problem than control flow can. At any time in a computation there may be many instructions whose operands are ready and may therefore be executed. A control flow processor would have to execute them in its predefined sequence, while a data driven processor may execute them in any order and in fact may execute them in parallel if additional processors are available. Since a computation is built around operations and not stored data, the operations may be stored in any of the multiple processors and the computation is still guaranteed to give the same result, only faster because more processors were available to work on it.

Examples of prior art implementation of both control flow architectures and data flow architectures will place in perspective some of the present problems and some of the attempted solutions.

The NEDIPS data flow computer architecture is targeted for applications in image processing. This architecture is described in ITO et al, "NEDIPS: A Non-von Neumann High-Speed Computer", 78 *NEC Research and Development*, pp. 83–90 (July 1985). It, like many of the data flow architectures being developed, uses a special control flow processor to track the arrival of data items and match them with other data items to schedule instructions. Data that has arrived but is insufficient to fire an instruction must be held in a special queueing memory until the rest of the data arrives.

The Eazyflow Engine architecture is a demand driven (rather than data driven) machine. This architecture is described in the article, Jagannathan et al, "Eazyflow Engine Architecture", 1985 *Conference on Computers and Communications* (Phoenix) pp 161–165 (IEEE reference CH2154-3/85). Instructions are not evaluated unless their result is required by another instruction. "Wasted" computations are therefore avoided, but at potentially great hardware expense. A separate matching memory is used (similar to the NEDIPS machine) to track data. The article suggests that this could be implemented as a content addressable memory, an approach very costly in hardware complexity and speed. The other recommended implementation is to search the matching memory, an approach too costly to be feasible on a high performance machine.

A processing element proposed for a multiprocessing data flow machine at MIT is representative of many proposed data flow architectures. Arvind et al, "A Processing Element for a Large Multiple Processor Dataflow Machine", 1980 *IEES Int'l Conference on Circuits and Computers*, pp 601–605 (IEEE reference CH1511-5/80). Once again a separate matching memory is used to track arriving data. The costs associated with such an approach are outlined above. When all the data required by an operation has arrived, the address of the operation is placed on a queue of ready instructions. The actual instruction must then be fetched and executed—much the same as in a control flow machine.

Another data flow processor from MIT (described in Dennis et al, "The Data Flow Engineering Model", 1983 *IFIP Information Processing*), uses microcoded processors to match data and instructions. The matching functions were then completely programmable, but many system clocks were required to determine if an instruction could fire. This processor is also believed to be the subject of U.S. Pat. Nos. 3,962,706, 4,145,733 and 4,153,932.

The SPS-1000 is a data flow architecture that utilizes data flow to schedule tasks. This is described in Fisher, "The SPS-1000: A Data Flow Architecture"; 1982 *Peripheral Array Processors Proceedings*, pp.77–82. The parallelism it can exploit is therefore limited to task level parallelism and is opposed to an operational level parallelism. The processing elements are essentially control flow processors, with polling of main memory used to allow run-time scheduling of the various image processing tasks.

The Manchester Data Flow Computer, described in Burd, "The Manchester Dataflow Machine"; *Proceedings of Int'l Symposium on Fifth Generation and Supercomputers* (December 1984), was the result of one of the first attempts to build a data flow computer. It shares many characteristics with its successors including a separate matching section and instruction queue. It, like the second MIT machine described above, relies heavily on microcoded processors for its major functions. This severely degrades the machine's overall throughput as described above. Being one of the first ventures into this field, this architecture was not aimed at parallel processing implementations.

A data flow computer architecture from France, the LAU coinputer described in Plas et al, "LAU System Architecture: A Parallel Data-Driven Processor", *Proceedings of 1976 Int'l Conference on Parallel Processing*, pp.293–302 (1976), was able to exploit operation level parallelism. It also used tags to mark the status of instructions. The tags were explicitly manipulated by the microcoded processors and not automatically manipulated with memory accesses. It shared the disadvantages of its reliance on microcoded processors with the other similar machines described above.

The Data Flow Accelerator Machine, DFAM described in Davidson et al, "A Data Flow Accelerator for General Purpose Processors," *Sandia National Lab. Tech. Report SAND*-0710 (March 1986), developed at Sandia National Labs, is an intelligent memory that can be added to conventional multiprocessor implementations having a shared memory architecture. Tagged memory is used, but the tags are used to track parameters for task level scheduling.

The foregoing review of some of the prior art computer architectures demonstrates that there is a need for new computer architectures suitable for massively parallel computing. The motivation is the present ever-increasing demand for processing throughput to run the scientific codes required by research and other engineering and applied science activities. The computer architectures need not be general purpose so long as the machines are able to solve a particular problem of interest and deliver significantly higher performance than currently available computers.

The operations required for the computation in data driven parallel processing do not change. The parameters required for a given computation also must remain the same. The only difference is that the operations are performed by physically separate processors. The actual order of instruction execution may change, out this is not a problem since a data driven processor by definition cannot execute instructions which are not ready for execution. Problems, once formulated to run on a single data driven processor, can therefore be migrated unchanged to parallel processing implementations. This is in stark contrast to the large amount of work required to migrate a control flow code that was built to run on a uni-processor to a parallel processor.

Thus there is still needed a data flow machine (DFM) that incorporates all of the advantages of the prior art data flow machines, yet can execute instructions as soon as they arrive at the processor without waiting for further data or instruction fetches.

SUMMARY OF THE INVENTION

The invention disclosed herein with respect to a particular embodiment overcomes the foregoing and other disadvantages and difficulties. While the array model that is the subject of this disclosure more closely resembles traditional handling of arrays, it still permits independent and random access of any element in the array. It has the added advantage of being able to efficiently stole large amounts of data. In one specific method a certain type of instruction, a ROUTe instruction, is used to store the data. For example, a ROUTA operation passes its input data (A) unchanged and uses one of its inputs (B) as the destination address. This operation is useful in in any cases such as the iterative technique discussed. It is also used to implement data stores for arrays as described below. Any processor supporting similar instructions can make use of this memory model. The description of its operation will assume the DFM architecture to keep the notation consistent.

A Data Flow Machine (DFM) processor according to the present invention includes a plurality of interconnected nodes, each node including a processor. The processor node according to a presently preferred embodiment has an accompanying memory that stores data together with the appropriate instruction. The memory includes means that tracks arriving data in hardware as that data arrives. When the data arrives, this means checks to see if all the other data is present by checking the status of associated data tags. If all other tags are set, the instruction if "fired" and thus sent along the data flow to a processor for execution.

The NEDIPS machine, described above, also must use special processor means to handle instructions with varying numbers of parameters, but the present DFM invention uses "sticky" bits to accomodate varying numbers of parameters on the same processor architecture.

Unlike the Arvind et al large multiple processor dataflow machine, the DFM architecture of the present invention does not queue up ready instructions or fetch them from memory. Instructions in DFM are executed as soon as the tagged memory detects that they are ready, and the instruction is dispatched immediately to the floating point computation unit.

The DFM instructions according to the present invention are fired in single clock cycles. This is in stark contrast to the Dennis MIT data flow processor. In that device the matching processors were implemented and logically viewed separately from the computation processors, again in contrast to DFM where each computation unit has its own local tagged memory.

The "sticky" tags, so important to the present invention's operation level data flow architecture, are not required in task level schedulers like DFAM. The DFAM architecture differs also in that operations are performed and results routed by a computation element local to the tagged memory. Each computation element in DFM has its own local tagged memory, rather a central tagged memory scheduling tasks for multiple control flow processors.

Other advantages and features of the present invention are discussed in or apparent to those skilled in the art.

DETAILED DESCRIPTION OF THE PREFERRED EMBODIMENTS

Figure 1:
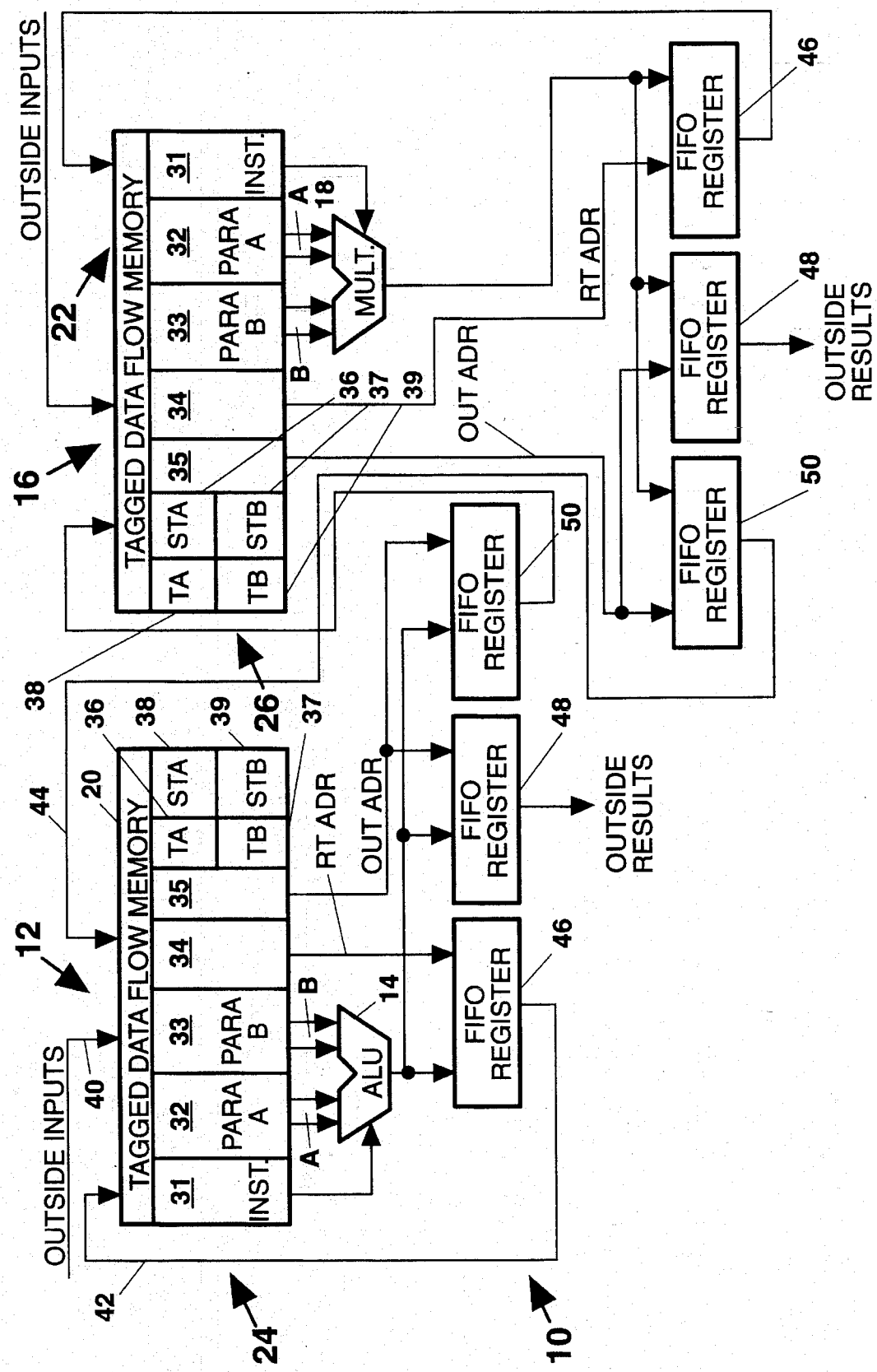
FIG. 1 is a generalized, schematic block diagram of a data flow processor node according to the present invention.

The present invention will now be described with reference to the accompanying figures in which like numerals represent like elements throughout.

I. The Instruction

The approach of the present invention utilizes an instruction packet as its basic element of computation. This instruction packet has the basic form:

OPERATION PARAMETER (S) DESTINATION (S)

where OPERATION defines the operation to be done on the Parameter(s). The results of the operation are then sent to the destinations identified by DESTINATION in the instruction packet, which in general will be additional operations. The instruction packets are stored in tagged memories. These memories are built with traditional memory components, but have tags associated with each parameter. The memories also have circuits to modify the tags with each access to a particular parameter, thus allowing the status of that parameter—ready or not ready—to be tracked. The memory system checks all the tags in an instruction any time a parameter arrives. If the tags indicate that all of the parameters are ready the instruction is dispatched for execution ("fired"). Otherwise the new parameter is stored, its tag modified, and the next data flow memory access begun.

The DFM instruction level data flow architecture according to the present invention requires that there be a maximum of a fixed number of parameters per instruction (two in the processor described here). This is to allow the data flow memories to be built as a very wide memory with access to an entire instruction packet in one memory cycle. Thus instruction can have fewer than the preset number of parameters, but never more.

The present architecture permits operations with fewer parameters through the use of "sticky" tags. These are tags that indicate that the parameter is always ready. A one parameter operation would therefore manage its single parameter as usual and set the tags for the unused parameters to be sticky. The arrival of the one needed parameter causes the dispatch of the instruction (i.e, causes the instruction to be sent to a processor, sometimes called "firing the instruction"), and only the tag corresponding to the used parameter would be cleared. Constant values may be handled in much the same way.

Associated with the tagged memories are corresponding execution units. Each instruction is executed when its parameters arrive but remains stored in the tagged memory associated with its execution unit. Thus only the results of operations are routed between parallel processors. Results may be routed to external ports as output data, and parameters may be introduced from external sources as input data.

This approach of the present invention allows the execution of an operation after every parameter store. At most, "n" parameter stores will be required for each operation where "n" is the number of parameters per instruction, and as mentioned above, n equals 2 for the present embodiment. The use of the "sticky" tags makes the actual number of parameters stores required to dispatch an instruction somewhere between 1 and n. The processor therefore processes all operations at the memory access rate, something even vector machines are only able to do under special conditions. This plus the ready extension to parallel processing permit the present architecture to be usuable in very nigh performance processors.

II. Description of a First Embodiment—The Dual Processor Node

A basic data flow processing node 10 is shown in FIG. 1 according to a first embodiment of the invention. Node 10 has two sides, a first side 12 having an ALU 14 for performing floating point operations and a second side 16 having a multiplier 18 for performing floating point multiplication operations. This subdivision permits better accommodation with currently available floating point chip sets which have their functions split between two chips (a multiplier and an ALU). In addition, the provision of two complementary data driven processors in each node allows the inclusion of dedicated data paths between them, thereby increasing the communication bandwidth of the entire machine as well as decreasing the latency between the two functions. It has the further benefit of doubling the memory bandwidth of each node (assuming roughly equal usage of ALU 14 and multiplier 18). In general, the two processor architecture is best usuable in those problems in which the number of additions is approximately equal to the number of multiplications.

Both sides 12 and 16 of processing node 10 have corresponding tagged data flow memories, respectively denoted 20 and 22. The operation of memories 20 and 22 are discussed below, but memories 20 and 22 are very wide to provide a high bandwidth that is needed to keep the processing units busy.

Memories 20 and 22 each have a large plurality of individual memory locations, one of which for each memory, denoted 24 and 26 respectively, is depicted. Each memory location 24 or 26 is comprised of nine separate areas, denoted 31 through 39, respectively, for storing the following items:

Area 31 stores the "instruction" which indicates the operation to be performed;

Area 32 stores "parameter A" which is the first parameter required for the operation;

Area 33 stores "parameter B" which is the second parameter required for the operation;

Area 34 stores the "in address" which is the destination in the corresponding memory for storage of the result of the operation and which contains a "0" value when no copy of the result is needed in this memory;

Area 35 stores the "out address" which is the destination outside of the corresponding memory for storage of a copy of the result of the operation and which contains a "0" value when no copy is needed;

Area 36 stores the "tag A" which is the flag associated with parameter A and which according to the present invention has a "0" value when parameter A is not ready and a "1" value when parameter A is ready;

Area 37 stores the "tag B" which is the flag associated with parameter B and which according to the present invention has a "0" value when parameter B is not ready and a "1" value when parameter B is ready;

Area 38 stores the "tagAsticky" which is the value tagA should take when the operation is fired; and Area 39 stores the "tagBsticky" which is the value tagB should take when the operation is fired.

Each data flow memory 24 or 26 also have corresponding inputs and outputs, but only those for memory 24 will be described. Memory 24 has three inputs, an outside input 40, an internal FIFO input 42, and an external FIFO input 44 coupled to memory, 26 or 24, respectively. Each memory also has three destination or output FIFO registers, an internal FIFO output register 46, connected as mentioned above to input 42; an external FIFO output register 48, connected to another node 10 (not shown); and an external FIFO output register 50, connected as mentioned above to the input 44 of the other memory.

The provision of fixed values in areas 38 and 39 allows "sticky" tags (tags that stay set) for use with always ready parameters and with one parameter operations. The tagAsticky and tagBsticky allow the processor to execute as fast as one operation per data flow memory access. Setting both will not cause a one operation loop as the tags are only tested when a parameter arrives.

III. Operation Of The Dual Processor Node

In the operation of node 10, the arrival of a parameter causes the tag for that parameter to be set. The tags for the appropriate areas 34 and 35 are then checked. If either tag is 0 the instruction is not fired and the next parameter access is started. If both tags are set the instruction is fired, sending the operation and both parameters to the execution unit and the in and out addresses to the destination FIFO registers 46, 48, and 50. The result of the operation is then written to the destination FIFO registers 46, 48, and 50 along with the return address only if that return address is nonzero. Also, only one of the two FIFO registers 48 or 50 connected to the out address is written with a given result.

During each cycle the data flow memories 24 and 26 read a parameter from their three inputs 40, 42 and 44. First priority is given to outside inputs connected at input 40. If there are no outside inputs the FIFO register that contains results generated by its associated execution unit is read. If that FIFO register is empty the FIFO register containing results generated by the other half of the node is read. This ensures that the downloading of code will complete before any intermediate results are routed amongst the processors.

IV. Programming Of The Present Invention

The assembly language for this machine bears some resemblance to that of traditional machines. It is described below with some example programs. Exemplary instructions or operations that can be implemented are shown in Table 1.

TABLE 1

| Operations Implemented | | |
|---|---|---|
| execution unit | pneumonic | function |
| multiplier | MULAB | A * B |
| alu | ADDAB | A + B |
| | SUBAB | A − B |
| | SUBBA | B − A |
| | DIVAB | A/B |
| | SQRTA | A |
| | SQRTB | B |
| both | PASSA | A+ee |
| | PASSB | +e,rad B |
| | ROUTA | A, B is used as the out address |
| | ROUTB | B, A is used as the out address |

This is a subset of the operations that are possible and others would be obvious to those skilled in the art. The arithmetic operations are substantially the same as conventional counterparts and thus need not be described further. The PASSA and PASSB operations pass their input data unmodified to their output destinations. The ROUTA and ROUTB operations function as a directed PASS. They pass their input data unchanged as the PASS does, but use one of their inputs as the destination. This operation is useful in many cases such as the iterative technique discussed later.

An assembly language statement has the form for a system according to the present invention in which there are a maximum of two parameters:

A/M (C) OPERATION PARMETERA PARAMETERB LABEL STKA STKB where a/m denotes whether the operation belongs in the ALU or multiplier;

(c) indicates whether the outputs are conditional;

operation represents one of the instructions that can be executed, such as one of those listed in Table 1;

parameterA and parameterB are the parameters required by the instruction;

label is the name or identifier of the result of the operation; and stKA or sA and stkB or sB are the "sticky" tags.

The functions required for assembly and linking may best be understood by looking at the examples in Table 2.

TABLE 2

| Assembly Language Examples | | | | | | |
|---|---|---|---|---|---|---|
| a/m | (c) | Op | Para A | Para B | label | sA | sB |
| Example 1: Single Instruction |
| a | | ADDAB | INPUTA | INPUTB | (host) | 0 | 0 |
| Example 2: Straight Line Code |
| a | | ADDAB | INPUTA | 2.0 | INPUT+2 | 0 | 1 |
| m | | MULAB | INPUT+2 | 2.0 | INPUT*2 | 0 | 1 |
| m | | MULAB | INPUT*2 | INPUTB | (host) | 0 | 0 |
| Example 3: Multiple Destinations |
| a | | ADDAB | INPUTA | INPUTB | SUMAB | 0 | 0 |
| a | | ADDAB | SUMAB | INPUTC | SUMABC | 0 | 0 |
| m | | MULAB | SUMAB | INPUTD | D*SUMAB | 0 | 0 |
| m | | MULAB | SUMAB | 4.0 | SUMAB*4 | 0 | 1 |

TABLE 2-continued

Assembly Language Examples

| a/m | (c) Op | Para A | Para B | label | sA | sB |
|---|---|---|---|---|---|---|
| | Example 4: Conditional Outputs | | | | | |
| a | CADDAB | INPUTA | INPUTB | SUMAB (host) | 0 | 0 |
| a | SUBAB | 0.0 | SUMAB | (host) | 1 | 0 |

Example 1 shows a single operation to be performed. The operation is to be placed in ALU 12 half 12 of the processor 10, and is to compute the sum of its two parameters. These two parameters have no initial value given by this statement (both are labels). The result of the computation is to be routed to the host. Both arguments are variable as neither of the two sticky tags bits are set. This operation will have the effect of adding the parameters that arrive into INPUTA and INPUTB and forwarding that result to the host. The assembler program places appropriate addresses to send the result to the host in the destination fields.

Example 2 shows a simple straight line computation of the algebraic equation: (A+2)*2*B. The first operation adds 2 to A. The sticky bit is set for the second parameter, indicating that the 2.0 is a constant. The first parameter is a label and is therefore not initialized, while the second parameter is a number and is initialized with that value. The result of this computation is labelled INPUT+2 for reference by other operations. The second operation requires the result of the first. It multiplies its parameter by a constant 2.0 and forwards the result to any operations that require the parameter labelled INPUT*2. Again the sticky bit is set for the second parameter. The last operation multiplies the result of the second by another input and forwards the result to the host. Since both parameters are variables, no sticky bits are set. Either manual programming or an assembler program would place the appropriate addresses to forward the results from one instruction to the next in the manner indicated by the parameter labels.

The third example shows an operation that generates results that are required by several other operations. INPUTA and INPUTB are summed and the result must be passed to each of the three other operations. The other three operations use that parameter to generate their results which are sent on to other operations. Once again the proper addresses must be placed in the destination fields by the assembler program, but this time there are not enough distination fields to route the result to all the operations. The assembler program therefore use the PASS operation to explicitly duplicate the parameter of all the operations which require it. Other examples of this situation may be found in the simulator input codes in the appendices. This explicit duplication of a parameter consumes some of the available computing resources as no useful computation is done when the parameter is duplicated. It is not as costly as it first appears, though, since the PASS operation when used to duplicate a parameter only requires a single write to fire and sends two parameters out, sufficient to fire one or two instructions during the next cycle.

An operation with a conditional output is shown in the fourth example in Table 2. The function being computed is A+B. If (A+B) is greater than or equal to zero, then the sum is routed to the host. If, however, (A+B) is less than zero, the result is routed to the label SUMAB. The second instruction subtracts this froth zero, negating the sum, and routes its result to the host.

Figure 2:
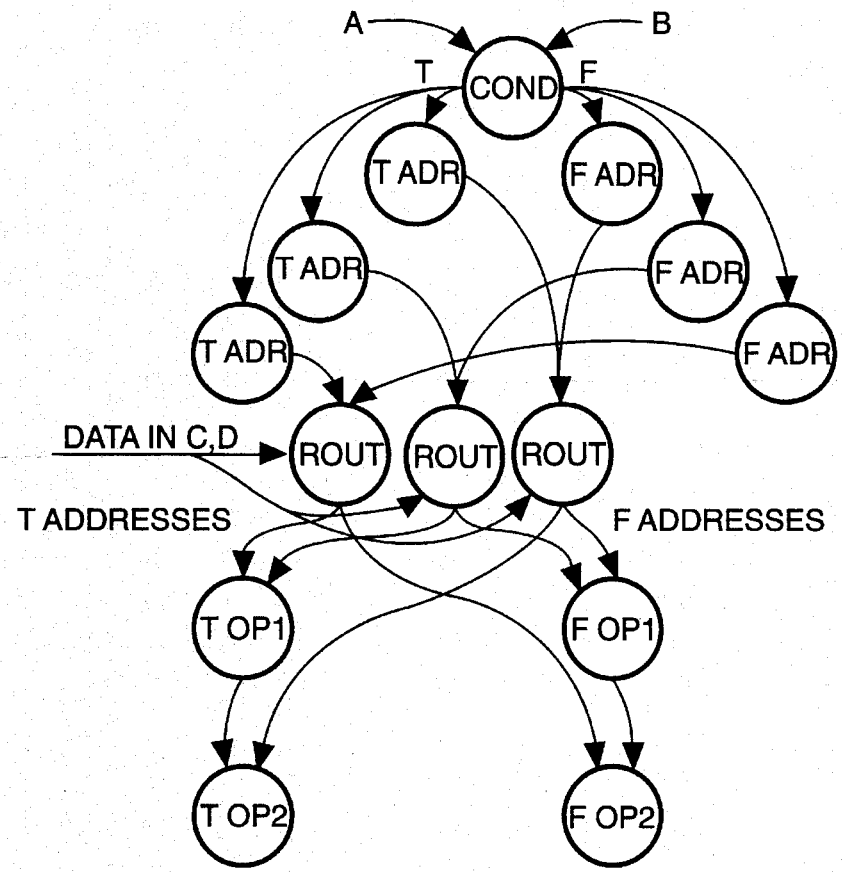
FIG. 2 is a data flow chart showing the possible paths in a conditional computation made according to the present invention.

The conditionals can be used to enable groups of computations as shown in FIG. 2. The two inputs that decide the conditional are shown at the top of FIG. 2 as "A" and "B". The inputs to the computations are shown at the left as "C" and "D". The conditional operation is performed and the result sent either to the "Greater than or Equal Zero" route (True or T side) or to the "Less than Zero" route (False or F side). The enabled side then passes its destinations to the ROUT operations below, which then send C and D to the appropriate operations.

The construct of FIG. 2 is analogous to the conditional branch in a conventional machine. There are no partially enabled operations left with this approach, so the conditional operation can be reused. The same concept can be applied to choose conditionally between the results of two sets of operations by routing one to the desired next operation and the other to a non-existent destination. These constructs are essential in iterative algorithms where the operations must be performed until some value stabilizes.

V. Description Of A Second Embodiment—Single Processor Node

Figure 3:
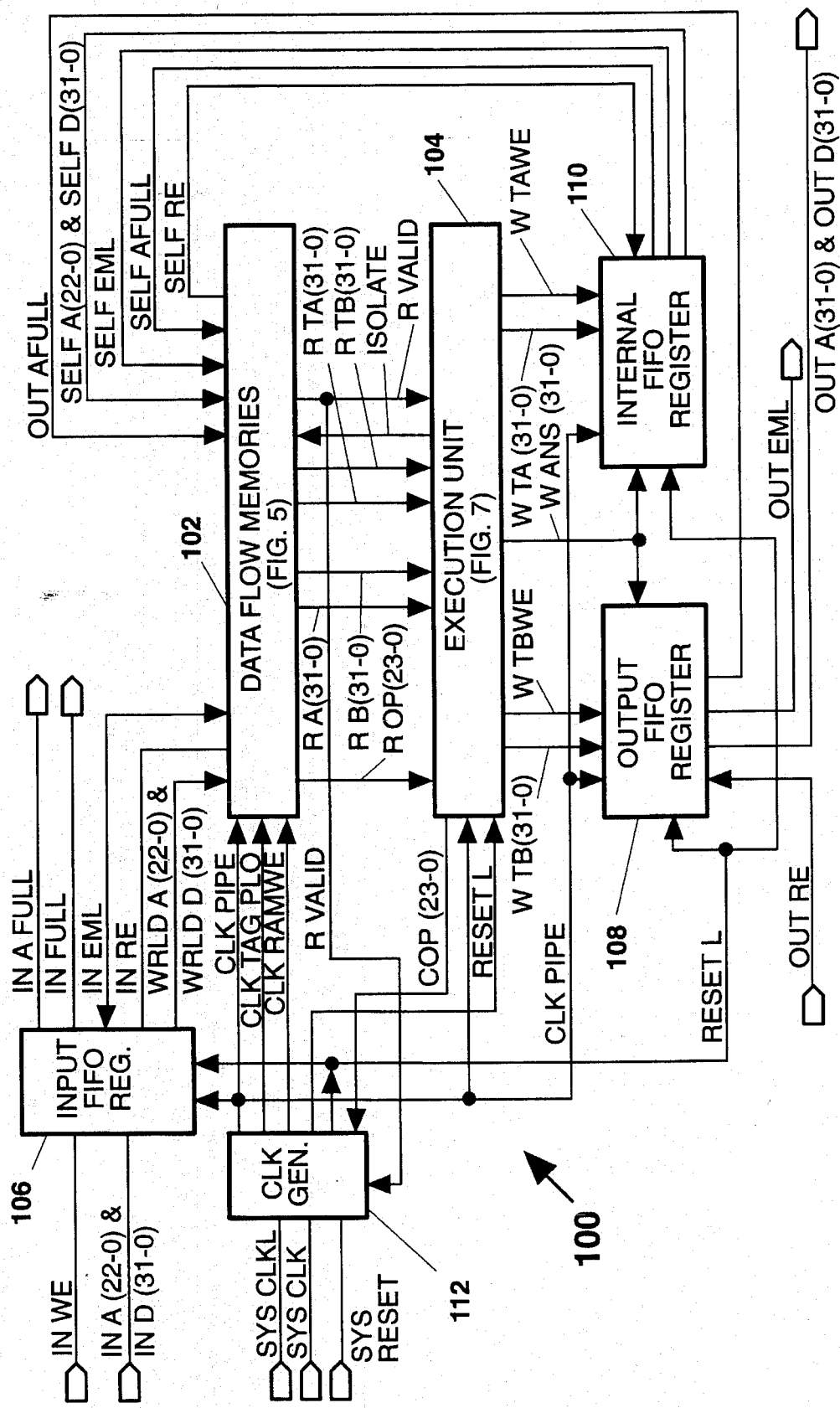
FIG. 3 is a system schematic block diagram of a working embodiment of the present invention and depicts data flow memories and an execution unit.

Referring now to FIGS. 3 through 9, a single processor node embodiment of the present invention will be described. This embodiment, which has been constructed and operated, is more suitable for solving those problems in which the number of additions or the number of multiplications required greatly exceed the other, or the relative number is unknown in the problem. Obviously this embodiment is less complex and less expensive than the dual processor node described above with respect to FIG. 1. Depicted in FIG. 3 is a block diagram of a computer processor node 100 which is part of a hardware system. The hardware system can simply comprise the hardware needed to generate the requisite power supplies, the requisite clock and hand shaking signals, and the interfacing for operator controls. The system signals provided to node 100 are a twenty-three bit address word (signal INA), a thirty-two bit data word (signal IN D), a system clock and inverted clock signals (signals SYS CLK and SYS CLKL), a system reset (signal SYS RESET), and a write enable signal (IN WE).

Node 100, as node 10 in FIG. 1, is comprised of three major components: a combination data flow memory 102, an execution unit 104, and a plurality of FIFO registers. The FIFO registers include an input FIFO register 106, an output FIFO register 108, and an internal FIFO register 110.

In addition to the major components, node 100 also is comprised of a control clock generator 112 (which receives a number of signals from the system and generates a number of internal node signals), a plurality of input/output connectors, and the requisite internal conductors, each labelled in FIG. 3 with the signal that it carries.

In labeling the signals the following convention has generally been adhered to. The letter "R" denotes data in the read stage of the pipline, generally from data flow memories 102 to execution unit 104. The letter "W+ denotes data in the write stage of the pipeline, generally from execution unit 104 to FIFO registers 106, 108 and 110. The letters "A" and "B" usually designate the "A" and "B" parameters and the letter "T" usually designates the tag associated with its corresponding paramneter. Those signals that emanate from input FIFO register 106 usually have the prefix "IN"; those that emanate from output FIFO register 108 usually have the prefix "OUT"; and those that emanate from internal FIFO register 110 usually have the prefix "SELF". If the last letters of the name of a signal is "L" (e.g. "RESETL), then that signal is active when low (i.e., a"0"). Finally, the following suffixes usually have the indicated meaning: "A" means "address" when it does not refer to Parameter A; "D" means "data"; "EM" means "empty", AFULL means "almost full", and FL means "full", and are handshake signals generated when a FIFO is empty so it cannot be read, almost full, and completely full so it cannot be written to, respectively; and "WE" means "write enable".

Figure 4:
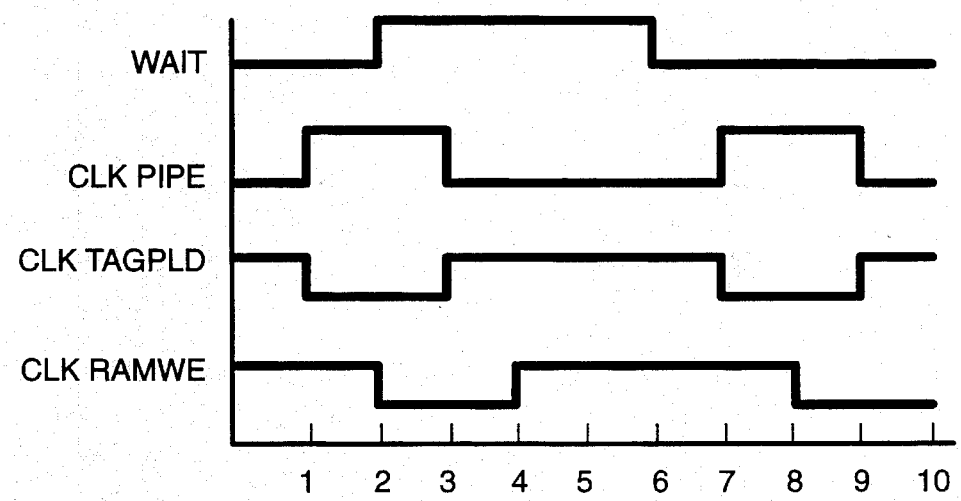
FIG. 4 is a timing graph showing the relationships between the various clock signals generated within the present invention.

Clock generator 112 is comprised of three clocked 16R8 PLD (Programmed Logic Device) integrated circuit (IC) chips (not shown). These chips generate the three nodal clock signals (CLK PIPE, CLK RAMWE, and CLK/TAG-PLD, which are depicted in FIG. 4. In FIG. 4, each vertical time line represents a half clock cycle. Clock signal CLK PIPE is the primary nodal clock signal and is used to clock various latches in the data flow memory 102; to clock the FIFO registers 106, 108 and 110; and to clock the major components in execution unit 104. Clock signal CLK TAG-PLD is the inverse of signal CLK PIPE, and it is used by a PLD to time the reading of the tags in a tag memory 114 (FIG. 5) in data flow memories 102. Clock signal CLK RAMWE is the same as clock signal CLK PLD, except it is delayed by half a clock cycle (i.e., it lags, or is out of phase with signal CLK PLD by 180 degrees), and is used by a PLD in data flow memories 102 to time the generation of the memory enable signals, described below. These chips also generate a nodal reset signal (RESET), which corresponds to the system reset signal (SYS RESET), and its logical inverted reset signal (RESETL).

The three PLD chips are programmed in the ABLE programming language. This is a well known language used to program PLD chips, such as the PLD chips commercially produced by Data I/O Company, among other companies. A commerically available assembler uses this code to create a "JEDEC" file which is used in turn by a commercially available PLD computer programming machine that has been programmed with a PLD programming code to cut the fusable links in a PLD.

A first PLD of clock generator 112, clocked by the system clock signal (SYS CLK), simply produces clock signals CLK PIPE and CLK TAGPLD depending upon the presence of the aforementioned WAIT signal generated by a second PLD. The programming of this first PLD, written in the ABLE programming language, is as follows:

discussed below) generated by data flow memories 102. The programming of this second PLD, written in the ABLE programming language, is as follows:

```
CNT3 := ((CNT3 & WAIT) $ (CNT0 & CNT1 & CNT2 & WAIT));
CNT2 := ((CNT3 & WAIT) $ (CNT0 & CNT1 & CNT2 & WAIT));
CNT1 := ((CNT1 & WAIT) $ (CNT0 & WAIT))
CNT0 := ((CNT0 & WAIT) $ WAIT);
WAIT := (!(((CNT1 & CNT2 & !C_OP4 & !C_OP1 & !C_OP2 & !C_OP3 &
C_OP12 & C_OP13 & C_VALID))#!C_VALID#(CNT1 & CNT3 &
C_VALID & !C_OP4 & C_OP1 & !C_OP2 & !C_OP3 & C_OP12 &
C_OP13))# (!C_OP12 # !C_OP13 #C_OP2 # C_OP3 # OP4)));
C_VALID := R_VALID;
```

As stated above, the internal clock generated signal WAIT is used to stop the clocking of all of the clocked components by freezing all nodal clock signals: signal CLK pipe being held LOW; signal CLK TAGPLD being held HIGH; and signal CLK RAMWE being held HIGH a half cycle after signal CLK TAGPLD. The generation of signal WAIT and the freezing of the nodal clocks is done in this embodiment of the invention because the hardware is constructed so that all components are used each cycle, irrespective of whether they are needed. Alternatively, the clock signals could have been gated, but that configuration usually results in signal propagation delays and requires more chips with a resulting complexity. Thus, for example, if the cycle begins with both parameters A and B awaiting data in a certain instruction being addressed to supply parameter A, the ordinary operation of the machine is that the instruction is not fired. However, every clock cycle results in accesses being made to all of the components of execution unit 104. These components, as described below in reference to FIG. 8, comprise a conventional multiplier and ALU ICs which utilize an internal mode register. If these chips were accessed when an instruction is not fired, then there would be garbage on the data and instruction lines to these ICs, and it would be possible that data being stored in the internal mode registers could be affected. Therefore, to prevent this adverse affect on the conventional ICs, the clock cycles are frozen whenever an instruction is not fired, i.e. signal R VALID is FALSE. Signal R VALID is generated in data flow memories 102, as described in greater detail below with respect to FIG. 6.

```
CLK_TAGPLD := ((!CLK_!TAGPLD & CLK_PIPE ) # (CLK_TAGPLD & !CLK_PIPE & WAIT ) );
CLK_PIPE  := ((!CLK_TAGPLD & !CLK_PIPE ) # (CLK_TAGPLD & !CLK_PIPE & !WAIT ) );
CLK_PIPE1 := ((!CLK_TAGPLD & !CLK_PIPE ) # (CLK_TAGPLD & !CLK_PIPE & !WAIT ) );
CLK_PIPE2 := ((!CLK_TAGPLD & !CLK_PIPE ) # (CLK_TAGPLD & !CLK_PIPE & !WAIT ) );
CLK_PIPE3 := ((!CLK_TAGPLD & !CLK_PIPE ) # (CLK_TAGPLD & !CLK_PIPE & !WAIT ) );
CLK_PIPE4 := ((!CLK_TAGPLD & !CLK_PIPE ) # (CLK_TAGPLD & !CLK_PIPE & !WAIT ) );
CLK_PIPE5 := ((!CLK_TAGPLD & !CLK_PIPE ) # (CLK_TAGPLD & !CLK_PIPE & !WAIT ) );
CLK_PIPE6 := ((!CLK_TAGPLD & !CLK_PIPE ) # (CLK_TAGPLD & !CLK_PIPE & !WAIT ) );
```

The second PLD, also clocked by the system signal (SYS CLK), produces signal WAIT by decoding six address lines (C OP4–0 and C OP13,12), the signals on which are ultimately produced by data flow memories 102 by way of execution unit 104, together with another signal (R VALID, The third PLD is clocked by inverted system clock signal SYS CLKL and receives as inputs, clock signal CLK TAG-PLD and the system reset signal (SYS RESET). This third PLD generates the nodal reset and inverted reset signals, RESET and RESETL, and clock signal CLK RAMWE according to the following ABLE program:

```
RESET:=SYS RESET;
RESETL0:=!SYS_RESET;
RESETL1:=!SYS_RESET;
RESETL2:=!SYS_RESET;
RESETL3:=!SYS_RESET;
RESETL4:=!SYS_RESET;
CLK_RAMWE:=CLK_TAGPLD;
```

The relative generated clock signals are depicted in FIG. 4 and the particular programming of the PLD IC chips is dependent upon the particular floating point arithmetic IC chips and other IC chips utilized in the other parts of the circuitry and is relatively straightforward.

The FIFO registers 106, 108, and 110 are each comprised of a plurality of conventional, commercially available MK4505S first-in, first-out registers. These are one kilobyte-by-five buffered registers having write enable inputs, provided by the CLK PIPE clock signals, and having resets, provided by the RESET signal. Each FIFO register also provides the corresponding FL and AFULL register full and almost full signals and the EML register empty signal as handshaking outputs to other FIFO registers in either the same node or another node. Input FIFO register 106 is comprised of eleven IC register chips (not shown) which receive thirty-two data bits (IN D0–D31) and twenty-three address bits (IN A0–A22) and provide corresponding thirty-two data bits (WRLD D0–D31), and twenty-three address bits (WRLD A0–A22). Output FIFO register 108 is comprised of thirteen IC register chips which receive thirty-two data bits (W ANS0–ANS31) and thirty-two address bits (W TB0–TB31) and provide corresponding thirty-two data bits (OUT D0–D31) and thirty-two address bits (OUT A0–A31). Internal FIFO register 110 is comprised of eleven IC register chips which receive thirty-two data bits (W ANS0–ANS31) and twenty-three address bits (W TA0–TA22) and provide corresponding thirty-two data bits (SELF D0–D31) and twenty-three address bits (SELF A0–A22).

Figure 5:
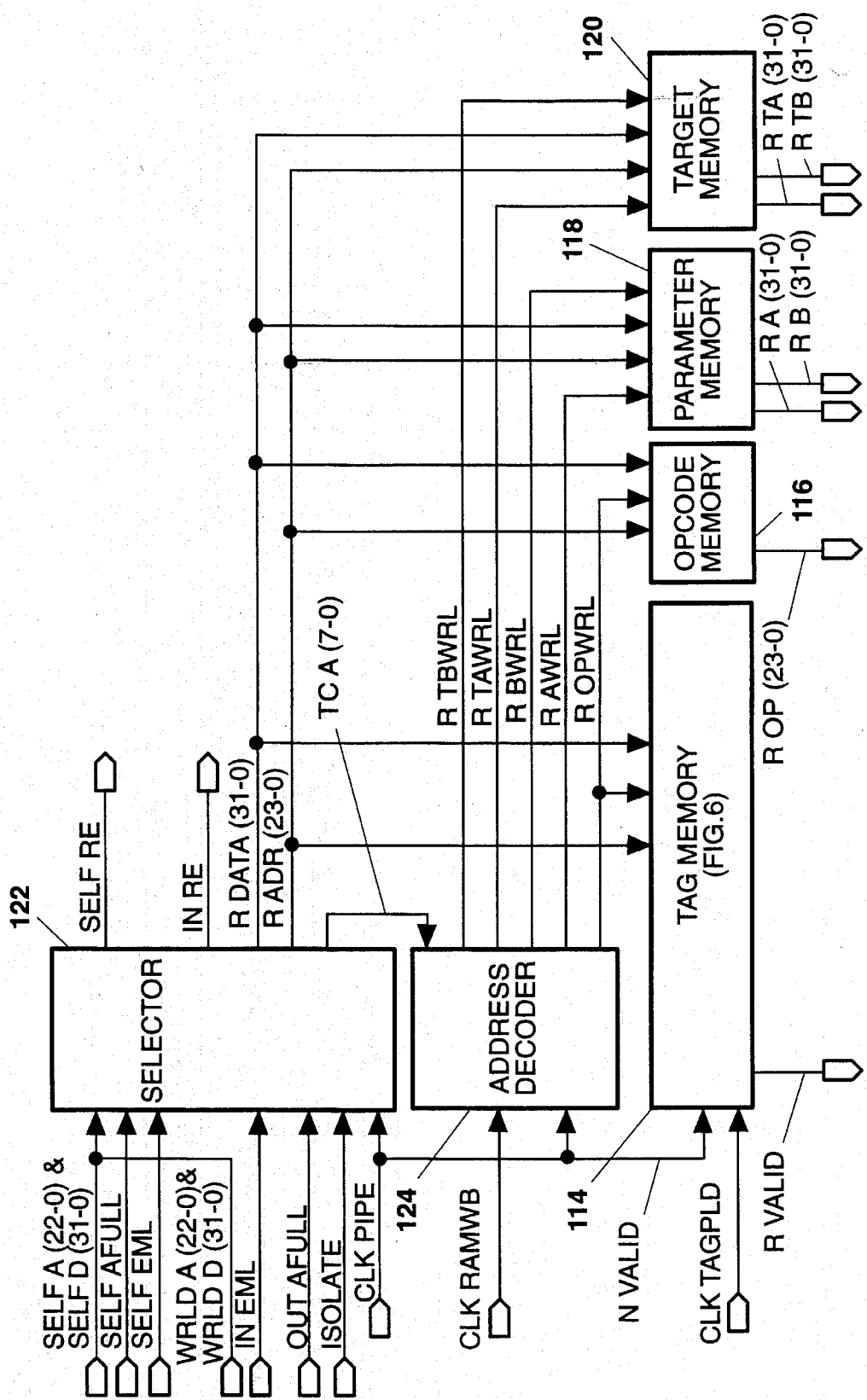
FIG. 5 is a detailed schematic block diagram of the Data Flow Memories of FIG. 3 depicting a tag memory and OPCODE, parameter and target memories.

With reference now to FIG. 5, data flow memories 102 will be described. Data flow memories 102 are the "heart" of the processor node 100 and are comprised of four memories, a tag memory 114, an OPCODE memory 116, a parameter memory 118, and a target memory 120. In the present embodiment data flow memories 102 provide for a 156 bit full processor word as follows:

24 bit OPCODE portion stored in opcode memory 116;

32 bit Parameter A stored in parameter memory 118;

32 bit Parameter B stored in parameter memory 118;

1 bit Tag A stored in tag memory 114;

1 bit Tag B stored in tag memory 114;

1 bit Sticky Tag A stored in tag memory 114;

1 bit Sticky Tag B stored in tag memory 114;

32 bit Target Address A stored in target memory 120; and 32 bit Target Address B stored in target memory 120.

In addition to the aforementioned memories, data flow memories are comprised of a selecter 122 which reads data and addresses from input FIFO register 106 or internal FIFO register 110, and an address decoder 124 which generates the appropriate memory write enable signals.

Figure 6:
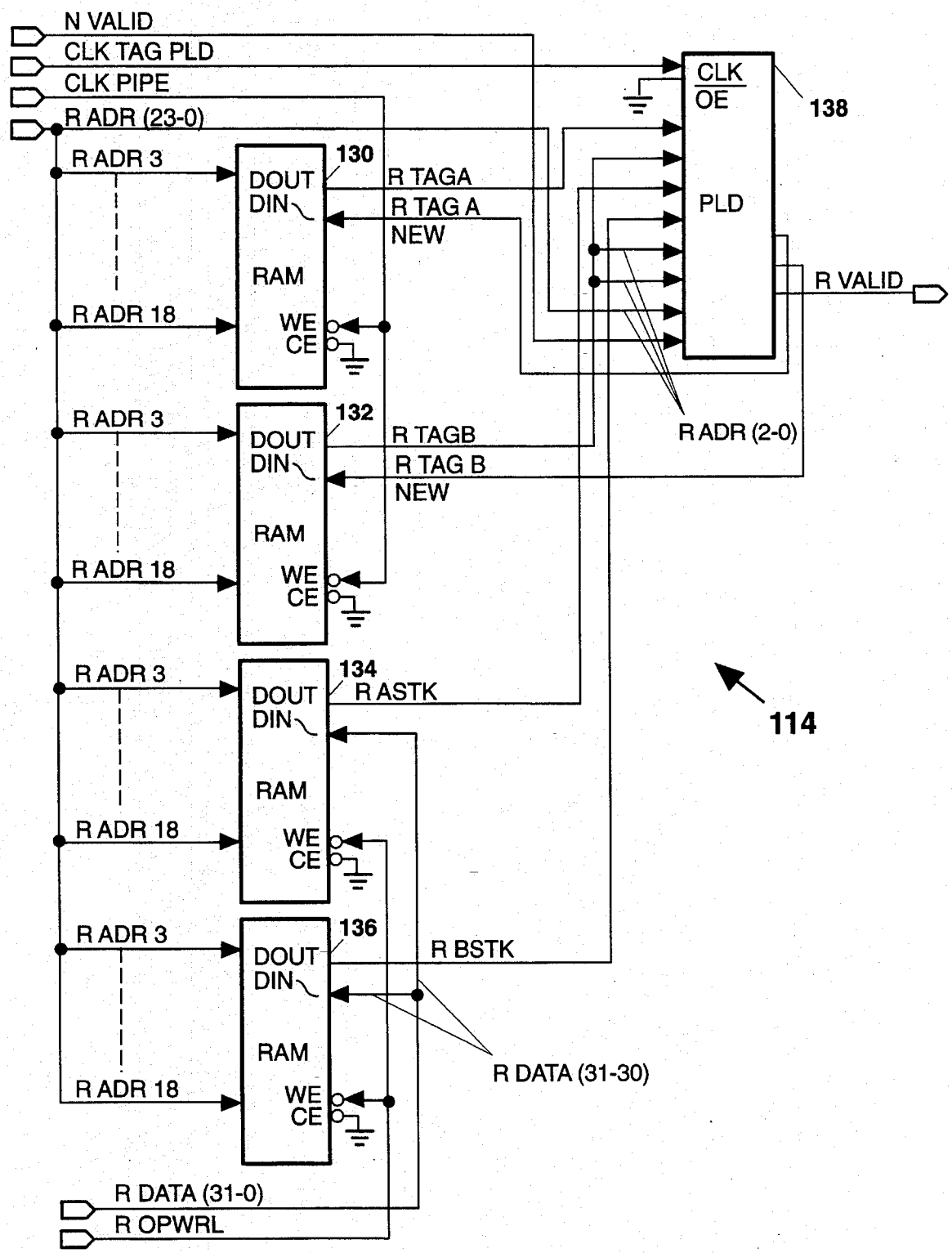
FIG. 6 is a detailed schematic block diagram of the tag memory of FIG. 5.

Tag memory 114 is depicted in greater detail in FIG. 6 and is comprised of four one bit wide RAMs (Read and Address Memories), a first RAM 130 for storing tag A, a second RAM 132 for storing tag B, a third for storing sticky tag A and a fourth RAM 136 for storing sticky tag B. Tag memory 114 is also comprised of a programmable logic device or PLD 138. Each one of RAMs 130, 132, 134 and 136 receives address lines for address bits 3 through 18 (signals R ADR3–R ADR18) generated by selector 122. The "clock enable" input (CE) of each RAM is grounded so that the memories are always enabled to provide other data or to receive data when a write signal is generated. Tag A and tag B RAMs 130 and 132 are enabled with the signal CLK PIPE and receive data input from a PLD 138. Sticky tag A and B RAMs 134 and 136 receive data bit 31 and 30, respectively, from signal R DATA generated also by selector 122, and are enabled with signal R OPWRL generated by address decoder 124 (FIG. 5), as described in greater detail hereinbelow. The states of the instruction's parameters A and B are kept respectively, in RAMs 130 and 132 and are read, modified and rewritten every clock cycle by signals from PLD 138. However, the sticky bits A and B, which are respectively kept in RAMs 134 and 136, are externally generated as bits 30 and 31 of the 32 bit R DATA word produced by selector 122. The sticky bits A and S are written into RAMS 134 and 136 when a write signal, signal R OPWRL, is generated by address decoder 124 (FIG. 5).

RAMs 130, 132, 134 and 136 can be comprised of conventional, commercially available memories, such as an integrated circuit P4C187, which is a 64K by 1 SRAMs. PLD 138 can also be a conventional commercially available integrated circuit chip such as a 16R4 programmable logic devices.

PLD 138 receives a clock signal, signal CLK TAGPLD, from clock generator 112 (FIG. 3). The chip also receives signal N VALID, which is generated by selector 122. Finally, PLD 138 receives tag A and tag B signals from RAMs 130 and 132, the sticky tag signals A and S from RAMs 134 and 136, and address lines 0 through 3 of signal R ADR generated by selector 122. In turn, PLD 138 generates new tags A and B signals and a signal R VALID which is utilized by execution unit 104. The generation of these signals by PLD 138 is in accordance with the following ABLE program:

```
VALIDOUT :=   (((VALIDIN & !A2 & !A1 & !A0 ) &
              TAGB ) # ((!A2 & !A1 & A0 & VALIDIN ) &
              TAGA ) ) :
TAGANEW :=    ((!(!A2 & A1 & !A0 & VALIDIN ) &
              (VALIDIN & !A2 & !A1 & !A0 ) &
              !(((VALIDIN & !A2 & !A1 & !A0 ) &
              TAGB ) # ((!A2 & !A1 & A0 & VALIDIN ) &
              TAGA ) ) ) #
              (TAGA & !(((VALIDIN & !A2 & !A1 & !A0 ) &
              !(!A2 & A1 & !A0 & VALIDIN ) ) # (ASTK &
              (((VALIDIN & !A2 & !A1 &
              !A0 ) & MM ) #
              ((!A2 & !A1 & A0 & VALIDIN ) &
              TAGA ) ) ) ) ;
TAGBNEW :=    (((!(!A2 & A1 & !A0 & VALIDIN ) &
              TAGA ) ) ) ;
              (!A2 & !A1 & A0 & VALIDIN ) &
              !(((VALIDIN & !A2 & !A1 & !A0 ) &
              TAGB ) #
              ((!A2 & !A1 & A0 & VALIDIN ) &
              !TAGA ) ) ) # (TAGB &
              !(((!VALIDIN & !A2 & !A1 & !A0 ) &
              TAGB ) #
              ((!A2 & !A1 & A0 & VALIDIN ) &
              TAGA ) ) & !(!A2 & A1 & !A0 &
              VALIDIN ) ) # (BSTK &
              (((VALIDIN & !A2 & !A1 & !A0 &
              VALIDIN ) & TAGA ) ) ) ) ;
              TAGB ) # ((!A2 & !A1 & A0 & VALIDIN ) &
```

-continued

```
!TAGA))));
```

The remaining memories of memories 102, namely OPCODE memory 116, parameter memory 118, and target memory 120, are fairly conventional memories and in the present embodiment can simply be comprised of commercially available integrated circuit chips CYC 161. These memories receive 14 address lines and store 16K by four bits of data. The clock enable inputs to all of the memory chips is grounded so that the memories can be asynchronously read. The data can be written to the various memories when the appropriate write signals are generated by address decoder 124.

In the case of OPCODE memory 116, a preferred working embodiment has 6 memory chips tied together in series to produce a 24 bit output, namely signal R OP23–OP0). These memories are addressed by an address signal R ADR3–ADR16, produced by selector 122. Data to be written into OPCODE memory 116 is generated by selector 122 and is comprised of signals R DATA23–DATA0). The write enable signal, namely signal R OPWRL, is produced by address decoder 124.

Parameter memory 118 in a preferred embodiment comprises sixteen integrated circuit chips in two banks of 8 chips apiece, one bank being for parameter A and the other bank being for parameter B. These memory chips are addressed by signals R ADR16–ADR3) produced by selector 122 and provide data as two 32 bit words, namely signals R A31–A0) and R B31–B0). Write enable signals for the two banks of memory are respectively signals R AWRL and R BWRL generated by address decoder 124 (FIG. 5).

Target memory 120 is similarly comprised of sixteen memory chips arranged in two banks of 8 memory chips each. It receives 32 bits of data and 14 bits of address from selector 122 as, respectively, signals R DATA31–DATA0 and R ADR16–ADR3. Each bank receives write signals produced by addressed decoder 124 as signals R TAWRL and R TBWRL, respectively. The data outputs from target memory 120 are provided as signals R TA31–TA0 and R TB31–TB0.

Selector 122 of data flow memories 102 is comprised of two substantially similar banks of latches (not shown), each bank for receiving and storing information from input FIFO register 106 (signals WRLD A(22–0) and WRLD D(32–0)) and internal FIFO register 110 (FIG. 3) (signals SELF A(22–0) and SELF D(31–0)), respectively. Two banks of latches are used to provide the requisite power to drive the memories connected to the bus. Each bank of latches is divided into subbanks for storing the data respectively from FIFO registers 106 and 110 and each subbank is further subdivided into a first part for storing address information and a second part for storing data information. The latches act as a two-to-one multiplexer by appropriately enabling the desired set of latches with signals generated by an internal decoder (not shown), described below. In the working embodiment of the invention, each bank of latches is comprised of fourteen 54LS374 integrated circuit chips, which are 8 bit latches.

Selector 122 is also comprised of a second set of two 8-bit latches (not shown), such as 54LS374 integrated circuit chips. These latches respectively receive corresponding address (bits SELF A7–A0 and WRLD A7–A0) from internal FIFO register 110 and input FIFO register 106. The latches are clocked by signal CLK PIPE and generate signals TCA7–A0 which are sent to address decoder 124 along a separate path to reduce the load on the buffers and to ensure that there is no interference in the timing that is so critical in the selection of the appropriate memory to be enabled.

Selector 122 also includes a decoder (not shown) for generating control signals in a conventional manner. This decoder can be a conventional decoder, such as PLD integrated circuit chip 16R6. The decoder receives handshaking signals from the three FIFO registers: from input FIFO register 106 it receives signal IN EWL; from output FIFO register 108 it receives signal OUT AFULL; and from internal FIFO register 110 it receives signals SELF EWL and SELF AFULL. In addition, the decoder receives a signal from execution unit 104 (FIG. 3), namely, signal ISOLATE, and is clocked by signal CLK PIPE. The outputs from the decoder include signals SELF ENL and WRLD ENL, for enabling the appropriate subbanks of latches for storing the information from either internal FIFO register 110 or input FIFO register 106, respectively. In addition, this decoder generates a signal SELF RE and a signal IN RE used for respectively enabling FIFOs 106 and 110. Finally, the decoder generates a signal N VALID that is supplied to address decoder 124 and to tag memory 114 to prevent writing data into any of the memories by controlling the generation of the write enable or tag signals. Signal N VALID is true (or high) when input and internal FIFO registers 106 and 110 (i.e. the registers supplying information) have data in them (i.e. signals IN EML and SELF EML are high) when output and internal FIFO registers 108 and 110 (i.e. the registers receiving information) are not almost full (i.e. signals OUT AFULL and SELF AFULL are high), and when the signal ISOLATE has not been generated.

Address decoder 124 of data flow memories 102 (FIG. 5) is used to generate the appropriate signals for selecting the memories into which the inputs received by the FIFO registers are written. In the working embodiment of the invention, address decoder is a conventional 16R8 integrated circuit PLD chip. Decoder 124 receives a clocking signal from clock generator 112 (FIG. 3), namely signal CLK RAWME which is active when low, and receives decoding input signal N VALID, generated by selector 122 as mentioned above, and address signals TA A2–A0 from the above described additional set of latches in selector 122. The decoded outputs, as mentioned above, are one of the following signals: Signal R OPWRL sent to OPCODE memory 116; signals R AWRL and R SWRL sent to parameter memory 118; and signals R TAWRL and R TBWRL sent to target memory 120. The enable line of address decoder 124 is always grounded so that a decoded signal is always available upon receipt of the clock signal and signal N VALID being true.

Figure 7:
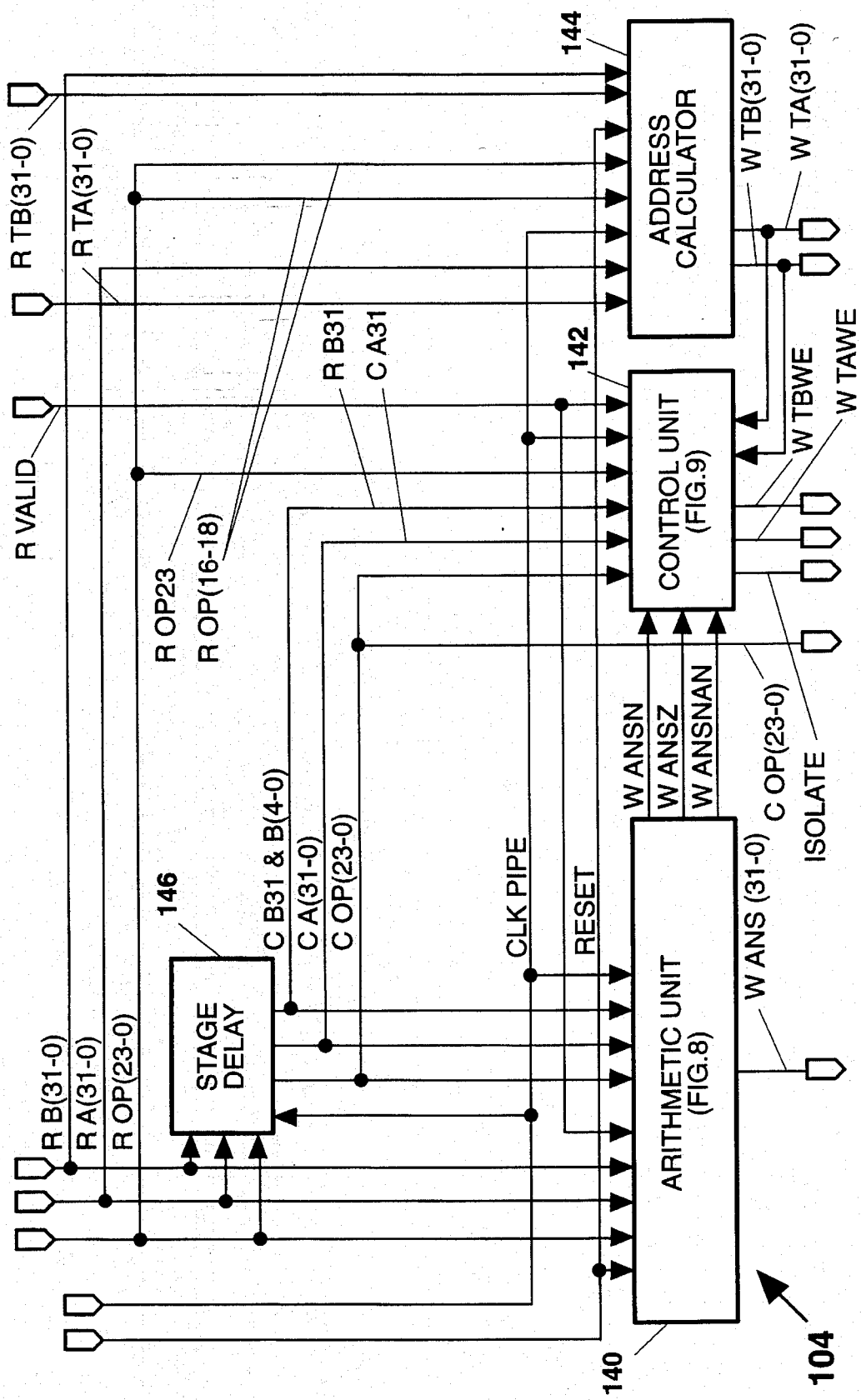
FIG. 7 is a detailed schematic block diagram of the execution unit of FIG. 3 depicting an arithmetic logic unit (ALU), a control unit and an address multiplexer.

Address decoder 124 is programmed in the ABLS prographing language as follows:

OPWRL=!((N_VALID & !CLK_RAMWE) & !A2 & A1 & !A0);

T1WRL=!((N_VALID & !CLK_RAMWE) & !A2 & A1 & A0);

T2WRL=!((N_VALID & !CLK_RAWME) & A2 & A1 & A0);

AWRL=!((N_VALID & !CLK_RAMWE) & !A2 & !A1 & !A0);

BWRL=!((N_VALID & !CLK_RAMWE) & !A2 & !A1 & A0);

Execution unit 104 is depicted, in block diagram form, in greater detail in FIG. 7. As depicted therein, execution unit 104 is comprised of an arithmetic unit 140, a control unit 142, an address calculator 144, and a stage delay 146, used for coordinating and delaying the application of certain signals from data flow memories 102 to control unit 142. Stage delay 146 also produces the signals C OP23–OP0 that are utilized by clock generator 112 for generating the wait signal, as mentioned above with respect to the discussion of FIG. 3. Stage delay 146 is comprised of seven 8-bit latches (not shown) which can be conventional 74LS374 IC chips. Two of these chips are used to generate signal C OP(3–4, 15–12,22–20) by latching corresponding signals from signal R OP(23–0), generated by OPCODE memory 116, as described above with reference to FIG. 5. One of the 8-bit latches of stage delay 146 is used to generate signals C B31 and C B (4–0). The remaining four latches are used to generate a full 32-bit data word C A(31–0). In every case, all of the latches are latched by clock signal CLK PIPE. All of the signals produced by stage delay 146 are provided to arithmetic unit 140 and control unit 142.

Figure 8:
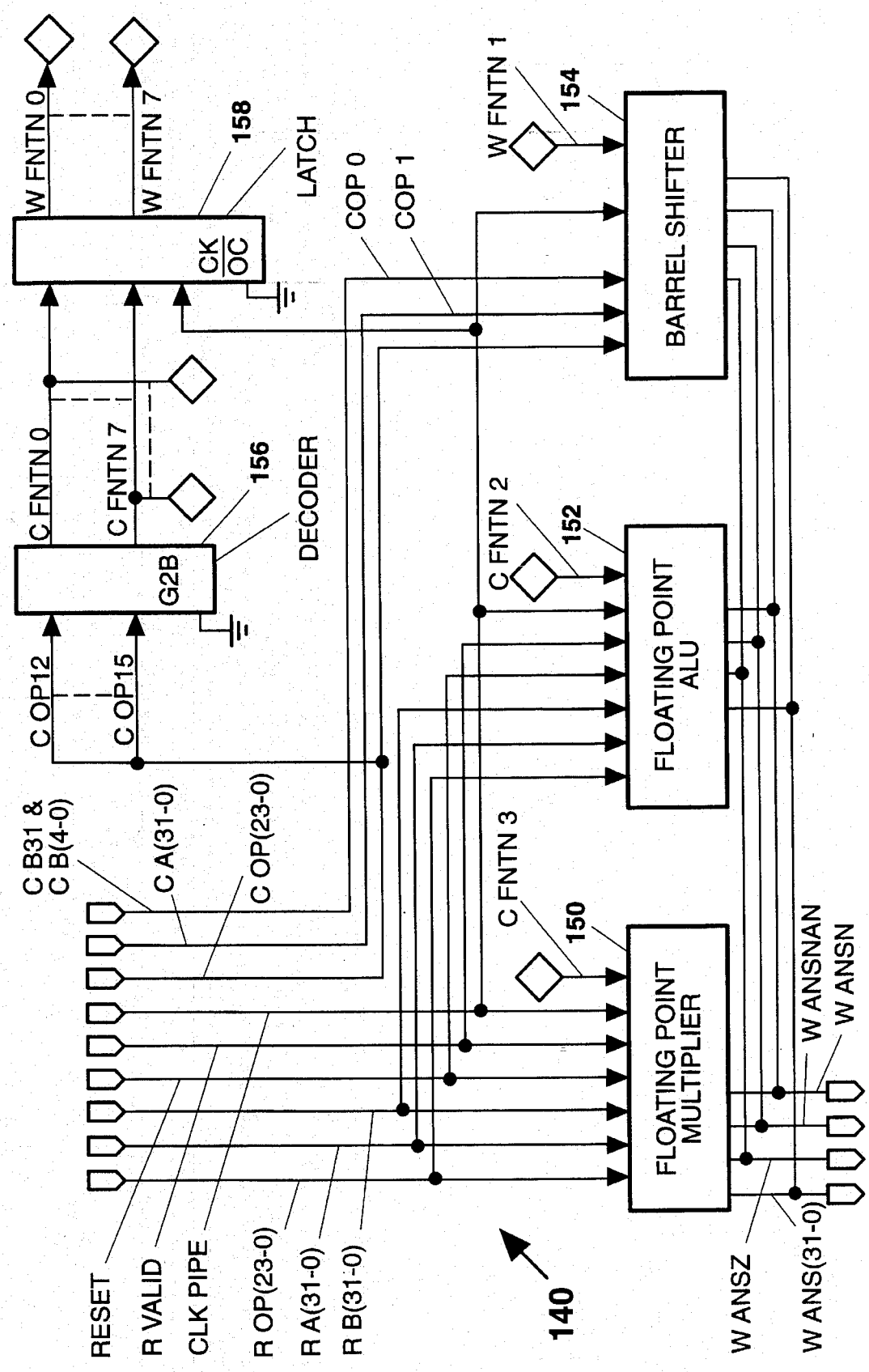
FIG. 8 is a detailed schematic block diagram of the arithmetic logic unit of FIG. 7.

Arithmetic unit 140 is depicted in greater detail in FIG. 8. Arithmetic unit 140 is comprised of three major calculating elements, namely a floating point multiplier 150, a floating point ALU 152, and a barrel shifter 154. In addition, it is comprised of a decoder 156 and a latch 158 used as a stage delay and clocked by signal CLK PIPFE. Decoder 156 and latch 158 respectively generate chip enable signals C FNIN (0–7) and W FNTN(0–7). Only bits 2 and 3 of decoder 156 are utilized to enable, respectively, ALU 152 and multiplier 150, the other bits being held for future expansion. For a similar reason, only one bit of the bits generated by latch 158 is utilized, namely bit 1, by barrel shifter 154. Decoder 156 can be a conventional 74LS138 IC chip, and latch 158 can be a conventional 74LS374 IC chip.

In the present embodiment, floating point multiplier 150, ALU 152 and barrel shifter 154 are all comprised of conventional floating point integrated circuit chips. Multiplier 150 is comprised of one B2110 IC chip, and ALU 152 is comprised of one B2120 IC chip. Both chips have the same inputs (except for the chip enable signal) and produce common outputs. In both cases, the signal R VALID is inverted before being applied to the "Y" and "X" enable inputs. Both chips are clocked by clock signal CLK PIPE and receive the node reset signal RESET. As mentioned above, multiplier 150 and ALU 152 are respectively enabled by signals C FNTN3 and C FNTN2 provided by decoder 156. Also, in the case of each chip, the instruction is received on bits 7 through 0 of the word output R OP produced by OPCODE memory 116 (FIG. 5). Finally, each chip receives the "A" and "B" parameters represented by signals R A(31–0) and R B(31–0) produced by parameter memory 118 (FIG. 5), and generate a 32-bit output word W ANS. In addition, each chip produces three condition signals indicative of the operation, namely signal W ANSN representing no output, signal W ANSZ representing a zero output, and W ANSNAN representing a "NON" result. These three condition generated signals are all used by control unit 142 (FIG. 7) as described below.

Barrel shifter 154 is comprised of a conventional 74AS8838 barrel shifter together with five 8-bit latches, four latches being 74LS374 IC chips and one, used as an encoder, being a 74LS245 IC chip. The encoder chip produces signal W ANSN (which means that the answer is negative and which is utilized by control unit 142 as described in greater detail below with respect to FIG. 9) from the most significant bit or the 31st bit generated by the barrel shifter and generates low signals for signals W ANSZ and W ANSNAN (thereby nullifying these signals which represent a zero result or not a number, i.e. an error, because they have no meaning in an operation utilizing the barrel shifter). The four latches receive all 32 bits generated by the barrel shifter and produce the output word W ANS, which is delayed until the generation of a clock pulse from clock signal CLK PIPS. This signal is also used to clock the encoder. The four latches are enabled by signal W FNTN1, as described above with respect to latch 158. The inputs to the barrel shifter IC are the 32 bits of word C A together with bits 1 and 0 of the word C OP generated by stage delay 146 (FIG. 7).

Thus, the particular operation to be performed by the three active components of arithmetic unit 140, namely multiplier 150, ALU 152 or barrel shifter 154, are determined, ultimately, by bits 15 through 12 of the word R OP stored in the OPCCOE memory 116 and selected by address lines 16–3 from signal R ADR.

Figure 9:
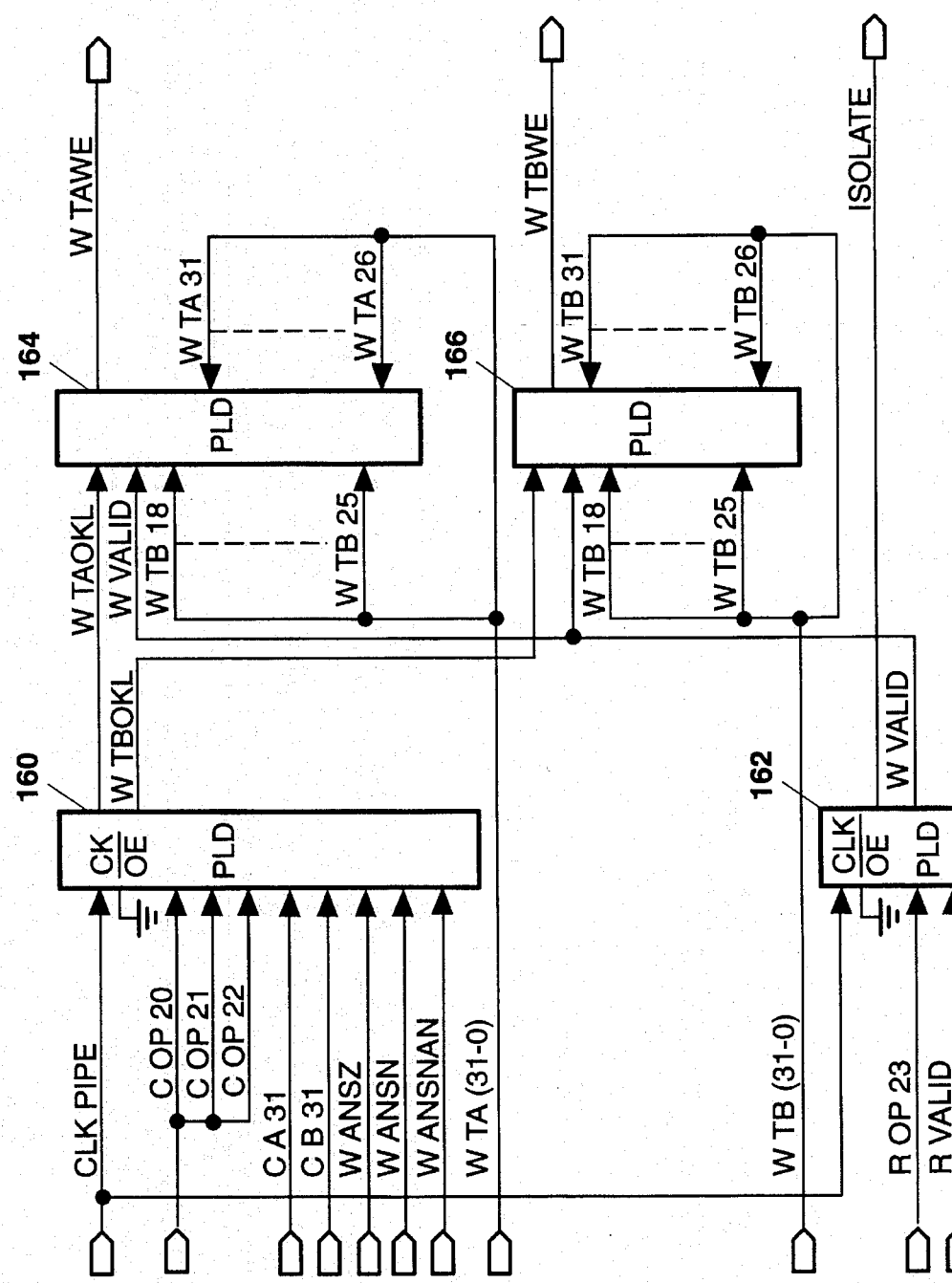
FIG. 9 is a detailed schematic circuit diagram of the control unit of FIG. 7.

Control unit 142 (FIG. 7) of execution unit 104 (FIG. 3) is depicted in FIG. 9. Control unit 142 generates the necessary signals to perform conditional operations, and these signals in turn control which output FIFO is being written to. Only two output signals are generated by control unit 142, namely: signal ISOLATE, signal W TAWE, and signal W TBWE. Signal "ISOLATE" is provided by control unit 142 to data flow memories 102 (FIG. 5), and more particularly, to the input control PLD of selector 122 (FIG. 5). Signal ISOLATE is used to prevent interruption of a process by isolating the processor from outside signals and permitting reads only from internal FIFO register 110 (FIG. 3).

Control unit 142 receives many inputs. First, as mentioned above, it receives the three condition signals generated by any one of the multiplier 150, ALU 152, or barrel shifter 154 of arithmetic unit 140. It also receives and is clocked by signal CLK PIPE. Control unit 142 also receives bits 22–20 of word COP; bits 31 of words C A and C B; bit 23 of word R OP, signal R VALID; and data words W TA and W TB. Output signals W TAWE and W TBWE are used to enable, respectively, each of the FIFO registers in internal FIFO register 110 and output FIFO register 108 (FIG. 3).

Control unit 142 is comprised of four PLDs 160, 162, 164 and 166. PLD 160 is preferably an 16R6 IC chip and the other three PLDs are 16R8 IC chips. These PLDs are programmed in the ABLE programming language as follows:

---

PLD 160:

W_TBOKL = !((!M0 & !M1 & !M2) # (( !M2 & M1 & !M0 & !W_A31 ) #
(!M2 & M1 & M0 & !W_B31 ) #
(M2 & !M1 & !M0 & !(W_ANSZRO # W_ANSNEG ) ) #
((M2 & !M1 & M0 & !W_ANSNEG ) #
(M2 & M1 & !M0 & !W_ANSZRO ) # (M2 & M1 & M0 & W_ANSNAN )))) ;
W_TAOKL = !((!M0 & !M1 & !M2) # ((!M2 & M1 & !M0 & W_A31 ) #
(!M2 & M1 & M0 & W_B31 ) #
(M2 & !M1 & !M0 & (W_ANSZRO # W_ANSNEG ) ) #
((M2 & !M1 & M0 & W_ANSNEG ) #

-continued

```
(M2 & M1 & !M0 & W_ANSZRO ) # (M2 & M1 & M0 & !W_ANSNAN )))) ;
M0 := C_OP20 ;
M1 := C_OP21 ;
M2 := C_OP22 ;
W_A31 := C_A31 ;
W_B31 := C_B31 ;
PLD 162:

ISOLATE =0 ((R_OP23 & R_VALID) # OF_ISO # W_OPISO # C_OPISO # INISOLATE ) ;
C_OPISO := R_OP23 & R_VALID ;
W_OPISO := C_OPISO ;
OF_ISO := W_OPISO ;
C_VALID := R_VALID ;
W_VALID := C_VALID ;
PLD 164:

W_TAWE = !((W_TA31 & W_TA30 & W_TA29 & W_TA28 & W_TA27 & W_TA26 & W_TA25 ) &
(W_TA24 & W_TA23 & W_TA22 & W_TA21 & W_TA20 & W_TA19 & W_TA18 ))
& W-VALID & !W_TAOKL ;
PLD 166:

W_TBWE = !((W_TB31 & W_TB30 & W_TB29 & W_TB28 & W_TB27 & W_TB26 & W_TB25 ) &
(W_TB24 & W_TB23 & W_TB22 & W_TB21 & W_TB20 & W_TB19 & W_TB18 ))
& W_VALID & !W_TBOKL ;
```

The final component of execution unit 104, namely address calculator 144 (FIG. 7), is used to manipulate the target address and is primarily used by the ROUT instructions. In a preferred embodiment, address calculator 144 is comprised of two floating point arithmetic logic units or ALUs (not shown), such as chip B2120 described above. Each chip generates a 32 bit output word (signal W TA or signal W TB, respectively) utilizing as inputs the A parameter and the target A address or the B parameter an the target B address, respectively. The appropriate ALU is enabled with bit 16 from word R OP or with bit 18 of word R OP. In this way either a ROUT A or a ROUT B instruction can be processed and the appropriate output address calculated. An inverter is used to generate an inverse signal R OP16 or 18 for application to input C16, D16, E16 and E17 of the B2120 ALU chip, and an uninverted signal is applied to input G15. As mentioned above, these instructions provide a pass-through for the parameter that is designated (i.e., parameter "A" for a ROUT A instruction) and use the other parameter to carry a relative destination address, the actual address being calculated by the appropriate one of the two ALUs that comprise address calculator 144. Although the preferred embodiment utilizes ALU chips, all that is really required are two 32 bit 2-to-1 multiplexers if the only function of address calculator is to select the appropriate return address (i.e. W TA or W TB). However, as stated above, the use of ALU chips give more flexibility for some cases, such as it allows the use of a target or a parameter for a destination address. It thus permits the use of relative addressing. For example, in a ROUT A instruction, the "A" ALU is disabled and the "B" ALU is enabled and The output of address calculator 144, as mentioned above, are signals W TA and W TB. Signal W TA is sent as an input to internal FIFO register 110 and signal W TB is sent as an input to output FIFO register 108 (FIG.3). Also as mentioned above, the particular FIFO register that is enabled depends upon the generation of signals W TAWE and W TBWE by control unit 142 (FIGS. 7 and 9). One of the criteria for generating an enabling signal at all is that the address information be valid. PLDs 164 and 166 (FIG. 9) receive and test the upper 14 address bits from address calculator 144 (bits W TA(18–31) and bits W TB(18–31), respectively) for all one's, and if detected, prohibits the generation of any FIFO enabling signals. For example, if an instruction is not ready to fire, then the output from address calculator is garbage and is clocked through the system instead of being written into one of the appropriate FIFO registers 108 or 110.

Now that the processor 100 has been described, the organization of the 24 bit OPCODE portion of the 156 bit full processor instruction can be explained. The OPOODE portion of the instruction contains the ceding utilized by the components of execution unit 104 and clock generator 112. Starting from the Least Significant Bit (LSB) end of the word, the first eight bits, bits R OP(7–0), are used for the instructions sets of floating point multiplier 150 and floating point ALU 152 (FIG. 8) of arithmetic unit 140 (FIG. 7) of execution unit 104 (FIG. 3). In addition, bits R OP(4–0) are latched in stage delay 146 (FIG. 7) and, when later clocked out, appear as bits C OP(4–0). Bits C OP(4–1) are used in one of the PLDs that comprise clock generator 112 (FIG. 3) to generate the signal WAIT (see FIG. 4). In addition, signals C OP(1–0) are used in barrel shifter to set the direction of rotation. The next four bits, bits R OP(11–8), are reserved and not used in the present invention. The next four bits, bits R OP(15–12) are latched in stage delay 146 (FIG. 7) and, when later clocked out, appear as bits C OP(15–12). Bit COP 15 is used to enable decoder 156 (FIG. 8), and bits C OP(14–12) are the three inputs to decoder 156 to be decoded. The decoded bits are signals C FNTN(7–0), three of which, C FNTN(3–1) are used directly or after first being latched to enable only one of floating point multiplier 150, floating point ALU 152, and barrel shifter 154. In addition, bits C OP(13–12) are used with bits COP (4–1) in clock generator 112. Bits R OP(19–16) are used as instructions for address calculator 144 (FIG. 7). Actually, in this embodiment, bits R OP17 and R OP19 are not used and bits R OP18 and R OP16 are respectively used to force a single "integer add" instruction on a respective one of the two ALUs (not shown) that comprise address calculator 144. Bits R OP(22–20) are latched in stage delay 146 (FIG. 7) and, when later clocked out, appear as bits C OP(22–20) which are used in PLD 160 to generate signals W TAOKL and W TBOKL. These signals, in turn, are used to generate signals W TAWE and W TBWE that enable output FIFO register 108 or internal FIFO register 110, respectively (FIG. 3). Finally, bit R OP23 is the isolate bit, and it is used together with signal R VALID in PLD 162 (FIG. 9) of control unit 142 (FIG. 7)

to generate signal ISOLATE.

Although the preferred embodiment uses floating point adders to give a little more flexibility for so,re cases, all that is required for address calculator 144 are two 32-bit, 2-to-1 multiplexers.

The above description of the one processor node embodiment describes a single node. Alternatively, the hardware system can also comprise a plurality of similar nodes 100 plus a controlling system computer in which the nodes have a conventional architecture.

VI. Simulated Operation Results

The basic node architecture described above has also been simulated at a functional level (corresponding to the MSI, LSI, and VLSI integrated circuits required to build the processor). The simulator is written in the C language. The processor is simulated one clock cycle at a time. The performance of a hardware implementation can thus be calculated from the simulated performance and the minimum clock cycle of the hardware implementation.

Several simple progreuns and their results that were run using the simulator are included in appendix B as examples of the low level code required by the present invention. In Appendix B.1, the assembly language coding for a simple ALU exercise is depicted to add the string of numbers "1", "1", "2", "3" and "4". The final answer is stored in location 30001 in the host or system computer. The coding follows the above mentioned requirements for a statement. In summary, these are as follows for line 1:

"a 1" means that an arithmetic operation is being performed and this is the first line of the coding "ADDAB" is the statement to add A+B "1" is parameter A "1" is parameter B "[18]" is the label of the result and a zero, such as in line 4, represents no label has been assigned "0" represents that there is no affect host address "0" is the sticky bit A, representing that it is not set since this A parameter while a constant is not being used again "1" is the sticky bit A, representing that the instruction should fire as soon as the parameter memory locations are addressed.

Appendices B.2 and B.3 are relatively straightforward and need no additional explanation. Appendix B.4 demonstrates the arguments and operations of a conditional exercise that is a single iteration. The number 1 is successively added to the number −20 and the result stored in host address 3000 until the result is greater than zero, than the result is stored in hose address 3000. The interim result is labelled "18" and the B sticky bit is set since the "B" parameter is a constant that is being successively added to the A parameter. Several more difficult problems were also simulated to better access the machine's performance. These included the particle push portion of a three dimensional PIC (particle in cell) code depicted in Appendix A; the computation of sin (x) depicted in Appendix C; and a successive relaxation solution of Poisson's equation depicted in Appendix D. Although the coding of the problems for the simulator was done entirely by hand and took several hours, an assembler/linker could be used.

The particle push is an example of a problem using straight line code that is solvable by the present invention. A simulated performance on this code was 12.6 MFLOPs for a single particle on a single processor node. The performance of a single node on a single particle is degraded by the numerous "bubbles" in this computation—places where only one half of the processor node has ready instructions to execute. With a change in the programming these bubbles could be filled with operations on other particles, thus increasing the overall throughput. As there are millions of particles to be pushed independently a single processor node according to the present invention should sustain nearly its 40 MFLOPs maximum throughput on the whole particle push phase of the problem. The large amount of parallelism present in the problem also makes it an ideal candidate for massively parallel processing. However, because this problem does not vectorize well, its use on prior art super computers is less efficient. For example, a Cray XMP-4/16 would be limited to under 25 MFLOPS. The relatively low cost and obvious extensibility of such a data driven processor would allow the use of many such processors to exploit the massive parallelism inherent in this problem.

The computation of sin (x) is just a more difficult version of the straight line computations discussed earlier. There is some parallelism in the series expansion used, and the computation could be spread among several processors.

Figure 10:
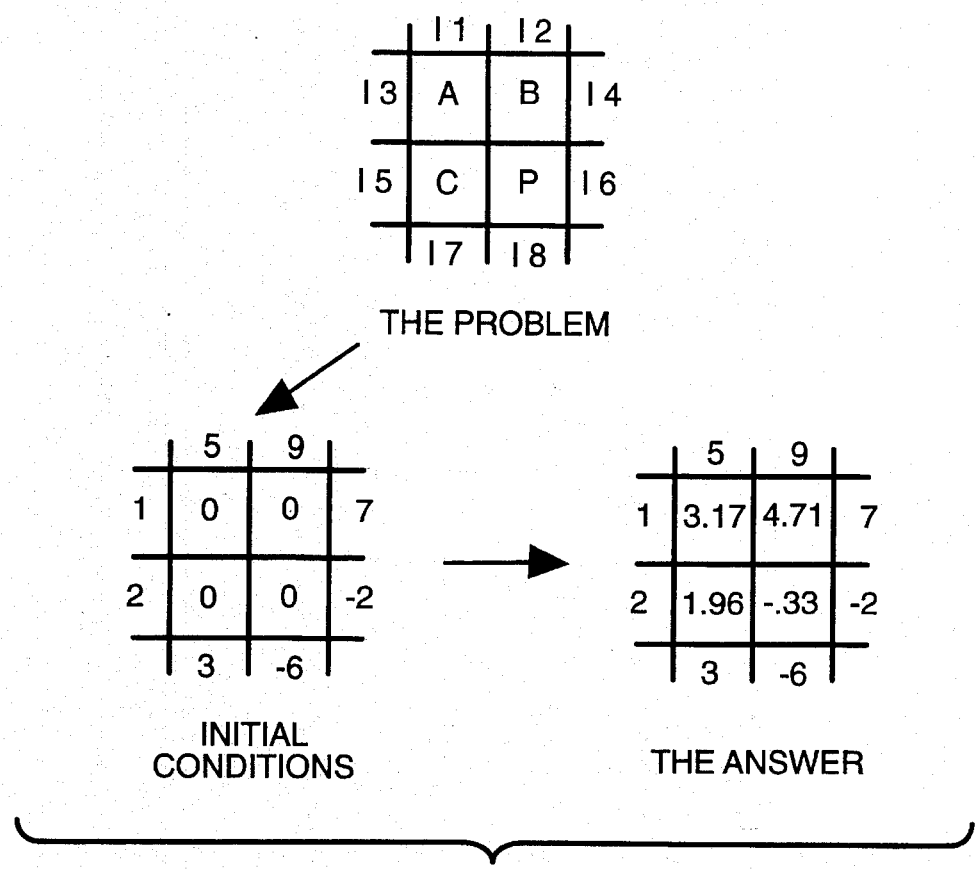
FIG. 10 is a chart showing the problem, initial conditions and the answer in successive relaxations.

The successive relaxation solution of Poisson's equation Appendix D) shows how iterative methods can be used with the architecture of the present invention. The problem solved is shown in FIG. 10. Basically, the problem is comprised of knowing the parameters (e.g. temperature) along the boundry or perimeter I1–I8 and asking for the values of the internal parameters A, B, C and D. The initial conditions have assigned values to the boundry parameters and assumed the internal parameters to be zero. The problem has been simulated to converge to within $10^{-16}$ total change between time iterations. The values of the internal parameters are shown in "The Answer" (FIG. 10). On a single processor, this took 55 iterations with the processor sustaining about 29 MIPs. Implementation of the present invention utilizing a parallel processor with limited broadcast capabilities would inhance the solution of this problem because the problem contains much explicit duplication.

The instruction issue rate of the present data flow processor can vary between one instruction every two memory accesses and one instruction every access depending upon the ratio of variable operands (no sticky tags) to fixed ones (sticky tags). A DFM processor built with currently available CMOS memory technology would therefore yield sustained performances between 20 and 40 MIPS (million instructions per second). Problems that require no explicit duplication of parameters would see between 20 and 40 MFLOPS performance, while those requiring explicit duplication would see this degraded by the instructions required to duplicate the parameters. Parallel processors built with this architecture could use the interprocessor communication to duplicate the parameters (by having each node use a copy of the parameter as it was routed among them).

In the DFM architecture described above the instructions are inherently tied to the execution unit in whose memory they reside in, thus complicating somewhat the load balancing. Allowing the routing and distribution of entire instruction packets (rather than just parameters) is possible, although such routing has the countervailing effect of raising the communication bandwidth requirements. The load can still be kept well balanced by intelligently distributing the instructions among the processors. The instructions can be redistributed with some cost in the DFM processor architecture since operations as well as parameters can be routed to the data flow memories. The operations are treated like un-tagged parameters.

The particular network topology used with data flow processor nodes according to the present invention should have little effect on the throughput achieved as long as there is sufficient parallelism to cover the latencies introduced by the interconnections. The additional parallelism exploited by data driven processing helps to hide these latencies. The switching network can really take on any form: binary n-cube, ring, mesh, tree, or any combination of these. However, the interconnection network has no effect on the results or on the code required to solve the problem. A host computer can be used as a front end processor for the data flow parallel processor. Communication with such a host would consist of the transfer of parameters and associated destinations between the host and the parallel processor. Output parameters and destinations could also be routed directly to a graphics interface or other output device. Inputs could likewise be taken directly from mass store, communication links, or other devices thereby obviating the need for a separate host. Such a stand-alone data flow parallel processor would require the successful resolution of the many research issues still to be faced.

Figure 11:
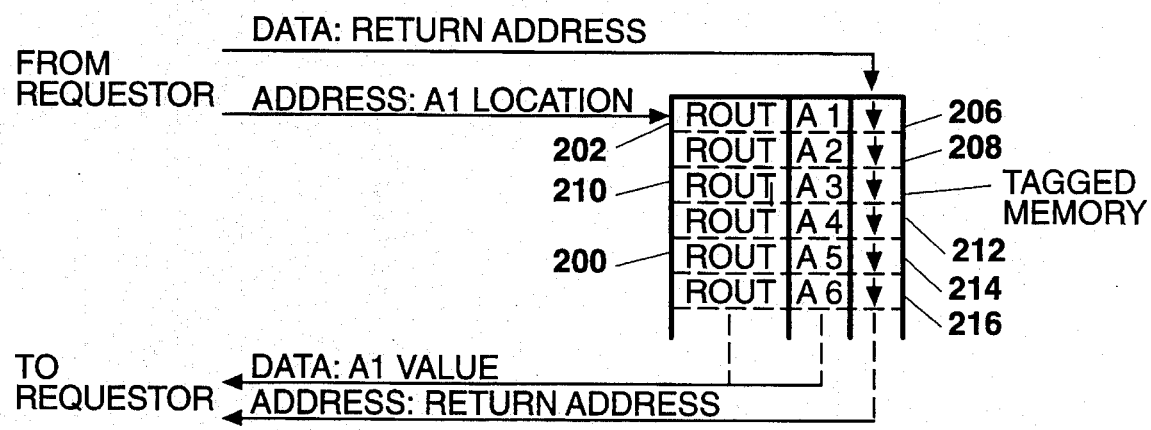
FIG. 11 is a flow chart showing how tagged memory supports the ROUT instruction.

Reference is now made to FIG. 11 which is a flow chart of arrays using the ROUT instruction in which a separate, dedicated memory 200 is used. FIG. 11 also demonstrates how data can be stored as an array 202 in memory 200 having an independent and random access of any element (206, 208, 210, 212, 214 and 216, in the present example) in the array by using one of the inputs as the destination address. The array data is stored as the first parameter in a ROUT instruction. When a computation requires a particular array value, it computes the location of the data (similar to address computation in a traditional machine) and sends the address of the operation needing the data to the ROUT's second parameter. The ROUT instruction fires, sending the array data to the return address. If the array data may be reused the tags are set to be sticky. The ROUT instruction will be fired again when the next request (return address) is sent to it. This model of array storage and use is consistent with a data driven model of computation, thus retaining the performance benefits of data flow processing and avoiding the problems associated with hybrid architectures.

If such an array store is included as a special memory board then the memory of a full DFM processor node it would not be wasted for the storage of the second parameter and the instruction. In such a special board, there is no need to utilize memory for the ROUT instruction or the second parameter as they would be implied by the board's function. The memory board therefore closely resembles a memory board for a traditional processor. Arrays can thus be stored with no wasted memory and accessed in a traditional manner with the data driven operations described above.

While the present invention has been described with respect to an exemplary embodiment thereof, it will be understood by those of ordinary skill in the art that variations and modifications can be effected within the scope and spirit of the invention.

| A. Particle in Cell Particle Push | | | | | |
|---|---|---|---|---|---|
| m | MULAB | DT | Q0 | F0NUM | 0 0 |
| m | MULAB | M0 | 2.0 | F0DEN | 0 1 |
| m | MULAB | Q0 | DT | A2N1 | 0 0 |
| m | MULAB | A2N1 | 3.0e8 | A2NUM | 0 1 |
| m | MULAB | M0 | 2.0 | A2DEN1 | 0 1 |
| m | MULAB | P1A | P1A | P1ASQ | 0 0 |
| m | MULAB | P2A | P2A | P2ASQ | 0 0 |
| m | MULAB | P3A | P3A | P3ASQ | 0 0 |
| m | MULAB | A2DEN3 | A2DEN1 | A2DEN | 0 0 |
| m | MULAB | B2 | B2 | B2SQ | 0 0 |
| m | MULAB | B3 | B3 | B3SQ | 0 0 |
| m | MULAB | AB2 | BB21 | BB2 | 0 0 |
| m | MULAB | BB2 | BB2 | BB2SQ | 0 0 |
| m | MULAB | BB2SQ | BB2SQ | BB2FR | 0 0 |
| m | MULAB | BB2SQ | .3 | SBB2SQ | 0 1 |
| m | MULAB | BB2FR | .2 | SBB2FR | 0 1 |
| m | MULAB | AB2 | F12 | F1 | 0 0 |
| m | MULAB | F1 | 2 | F2NUM | 0 0 |
| m | MULAB | F1 | F1 | F1SQ | 0 0 |
| m | MULAB | F1SQ | SUMBSQ | F2DEN1 | 0 0 |
| m | MULAB | F0 | E1 | F0E1 | 0 0 |
| m | MULAB | F0 | E2 | F0E2 | 0 0 |
| m | MULAB | F0 | E3 | F0E3 | 0 0 |
| m | MULAB | P2A | B3 | P2AB3 | 0 0 |
| m | MULAB | P3A | B2 | P3AB2 | 0 0 |
| m | MULAB | P3A | B1 | P3AB1 | 0 0 |
| m | MULAB | P1A | B3 | P1AB3 | 0 0 |
| m | MULAB | P1A | B2 | P1AB2 | 0 0 |
| m | MULAB | P2A | B1 | P2AB1 | 0 0 |
| m | MULAB | P1B1 | -F1 | P1B2 | 0 0 |
| m | MULAB | P2B1 | F1 | P2B2 | 0 0 |
| m | MULAB | P3B1 | F1 | P3B2 | 0 0 |
| m | MULAB | P2B | B3 | P2BB3 | 0 0 |
| m | MULAB | P3B | B2 | P3BB2 | 0 0 |
| m | MULAB | P3B | B1 | P3BB1 | 0 0 |
| m | MULAB | P1B | B3 | P1BB3 | 0 0 |
| m | MULAB | P1B | B2 | P1BB2 | 0 0 |
| m | MULAB | P1B | B1 | P2BB1 | 0 0 |
| m | MULAB | P1C1 | F2 | P1C2 | 0 0 |
| m | MULAB | P2C1 | F2 | P2C1 | 0 0 |
| m | MULAB | P3C1 | F2 | P3C2 | 0 0 |
| m | MULAB | P1NEW | P1NEW | P1NEWSQ | 0 0 |
| m | MULAB | P2NEW | P2NEW | P2NEWSQ | 0 0 |
| m | MULAB | P3NEW | P3NEW | P3NEWSQ | 0 0 |
| m | MULAB | P1NEW | GMA | V1NEW | 0 0 |
| m | MULAB | P2NEW | GMA | V2NEW | 0 0 |
| m | MULAB | P3NEW | GMA | V3NEW | 0 0 |
| m | MULAB | DT | V1NEW | DELTA1 | 0 0 |
| m | MULAB | DT | V2NEW | DELTA2 | 0 0 |
| m | MULAB | DT | V3NEW | DELTA3 | 0 0 |
| m | MULAB | Bi | B1 | B1SQ | 0 0 |
| a | DIVAB | A2NUM | A2DEN | AB2 | 0 0 |
| a | DIVAB | F0NUM | F0DEN | F0 | 0 0 |
| a | DRVAB | 3.0e8 | GMADEN | GMA | 1 0 |
| a | DIVAB | F2NUM | F2DEN | F2 | 0 0 |
| a | ADDAB | P1ASQ | P2ASQ | ISMPASQ | 0 0 |
| a | ADDAB | ISMPASQ | P3ASQ | SMPASQ | 0 0 |
| a | ADDAB | SMPASQ | 0.9e16 | A2DEN2 | 0 1 |
| a | ADDAB | SBB2SQ | SBB2FR | F11 | 0 0 |
| a | ADDAB | F11 | 1 | F12 | 0 1 |
| a | ADDAB | B1SQ | B1SQ | ISUMBSQ | 0 0 |
| a | ADDAB | ISUMBSQ | B3SQ | SUMBSQ | 0 0 |
| a | ADDAB | F2DEN1 | 1 | F2DEN | 0 1 |
| a | ADDAB | P1OLD | F0E1 | P1A | 0 0 |
| a | ADDAB | P2OLD | F0E2 | P2A | 0 0 |
| a | ADDAB | P3OLD | F0E3 | P3A | 0 0 |
| a | SUBAB | P2AB3 | P3AB2 | P1B1 | 0 0 |
| a | ADDAB | P1A | P1B2 | P1B | 0 0 |
| a | SUBAB | P3AB1 | P1AB3 | P2B1 | 0 0 |
| a | ADDAB | P2B2 | P2A | P2B | 0 0 |
| a | SUBAB | P1AB2 | P2AB1 | P3B1 | 0 0 |
| a | ADDAB | P3A | P3B2 | P3B | 0 0 |
| a | SUBAB | P2BB3 | P3BB2 | P1C1 | 0 0 |
| a | SUBAB | P3BB1 | P1BB3 | P2C1 | 0 0 |
| a | SUBAB | P1BB2 | P2BB1 | P3C1 | 0 0 |
| a | ADDAB | P1A | P1C2 | P1C | 0 0 |
| a | ADDAB | P2A | P2C2 | P2C | 0 0 |
| a | ADDAB | P3A | P3C2 | P3C | 0 0 |
| a | ADDAD | P1C | F0E1 | P1NEW | 0 0 |
| a | ADDAB | P2C | F0E2 | P2NEW | 0 0 |
| a | ADDAB | P3C | F0E3 | P3NEW | 0 0 |
| a | ADDAB | P1NEWSQ | P2NEWSQ | ISUMPSQ | 0 0 |
| a | ADDAB | ISUMPSQ | P3NEWSQ | SUMPSQ | 0 0 |
| a | ADDAB | SUMPSQ | 9.0e16 | GMADEN1 | 0 1 |
| a | ADDAB | Q1OLD | DELTA1 | Q1NEW | 0 0 |

| A. Particle in Cell Particle Push | | | | | |
|---|---|---|---|---|---|
| a | ADDAB | Q2OLD | DELTA2 | Q2NEW | 0 0 |
| a | ADDAB | Q3OLD | DELTA3 | Q3NEW | 0 0 |
| a | SQRT | A2DEN2 | 1.0 | A2DEN3 | 0 1 |
| a | SQRT | SB2 | 1.0 | BB21 | 0 1 |
| a | SQRT | GMADEN1 | 1.0 | GMADEN | 0 1 |

B Sample Codes

B.1 ALU exercise function: ((1+1)+2)+3 →30000, (((1+1)+2)+3)+4→30001

| a | 1 | ADDAB | 1 | 1 | 18 | 0 | 0 1 |
| a | 2 | ADDAB | [18] | 2 | 26 | 0 | 0 1 |
| a | 3 | ADDAB | [26] | 3 | 34 | 30000 | 0 1 |
| a | 4 | ADDAB | [34] | 4 | 0 | 30001 | 0 1 |

Simulator Output:

host out adr=30000, par=7.000000 host out adr=30001, par=11.000000 alu 0.500000 flops/parameter access multiplier 0.000000 flops/parameter access

B.2 Multiplier Exercise function: ((1 * 1)* 2)* 3→30000, (((1 * 1)* 2)* 3)* 4→30001

| a | 1 | MULAB | 1 | 1 | 18 | 0 | 0 1 |
| m | 2 | MULAB | [18] | 2 | 26 | 0 | 0 1 |
| m | 3 | MULAB | [26] | 3 | 34 | 30000 | 0 1 |
| m | 4 | MULAB | [34] | 4 | 0 | 30001 | 0 1 |

Simulator Output:

host out adr=30000, par=6.000000 host out adr=30001, par=24.000000 alu 0.000000 flops/parameter access multiplier 0.500000 flops/parameter access

B.3 ALU and Multiplier exercise function: ((1+1)+2)+3→30000, (((1+1)+2)+3)+4→30001, (1+1)* 1→20000, ((1+1)+2)* 2→20001

| a | 1 | ADDAB | 1 | 1 | 18 | 10 | 0 1 |
| a | 2 | ADDAB | [18] | 2 | 26 | 18 | 0 1 |
| a | 3 | ADDAB | [26] | 3 | 34 | 30000 | 0 1 |
| a | 4 | ADDAB | [34] | 4 | 0 | 30001 | 0 1 |
| m | 1 | MULAB | [10] | 1 | 0 | 20000 | 0 1 |
| m | 2 | MULAB | [18] | 2 | 0 | 20001 | 0 1 |

Simulator Output:

host out adr=20000, par=2.000000 host out adr=20001, par=8.000000 host out adr=30000, par=7.000000 host out adr=30001, par=11.000000 alu 0.500000 flops/parameter access multiplier 0.500000 flops/parameter access

B.4 Iteration function: i=−20, output i+1→20000 until i≧0, then output i→30000

| a | 1 | CADDAB | −20([10]) | 1 | 18 | 30000 | 0 1 |
| a | 2 | ADDAB | [18] | 1 | 26 | 20000 | 0 1 |
| a | 3 | SUBAB | [26] | 1 | 10 | 0 | 0 1 |

Simulator Output:

host out adr=20000, par=−18.000000 host out adr=20000, par=−17.000000 host out adr=20000, par=−16.000000 host out adr=20000, par=−15.000000 host out adr=20000, par=−14.000000 host out adr=20000, par=−13.000000 host out adr=20000, par=−12.000000 host out adr=20000, par=−11.000000 host out adr=20000, par=−10.000000 host out adr=20000, par=−9.000000 host out adr=20000, par=−8.000000 host out adr=20000, par=−7.000000 host out adr=20000, par=−6.000000 host out adr=20000, par=−5.000000 host out adr=20000, par=−4.000000 host out adr=20000, par=−3.000000 host out adr=20000, par=−2.000000 host out adr=20000, par=−1.000000 host out adr=20000, par=0.000000 host out adr=30000, par=0.000000 alu 0.950820 flops/parameter access multiplier 0.000000 flops/parameter access

B.5 Conditional Exercise function: |x+y|→30000, first case x=4, y=16, second case x=4, y=−14

| Case 1: | | | | | | |
|---|---|---|---|---|---|---|
| a | 1 | CADDAB | 4 | 16 | 19 | 30000 | 0 0 |
| a | 2 | SUBAB | 0 | [19] | 0 | 30000 | 1 0 |

Simulator Output:

host out adr=30000, par=20.000000 alu 0.500000 flops/parameter access multiplier 0.000000 flops/parameter access

| Case2: | | | | | | |
|---|---|---|---|---|---|---|
| a | 1 | CADDAB | 4 | −14 | 19 | 30000 | 0 0 |
| a | 2 | SUBAB | 0 | [19] | 0 | 30000 | 1 0 |

Simulator Output:

host out adr=30000, par=10.000000 alu 0.500000 flops/parameter access multiplier 0.000000 flops/parameter access

| C. Computation of sin x | | | | |
|---|---|---|---|---|
| m | MULAB | X | X | X2 | 0 0 |
| m | MULAB | X | X2 | X3 | 0 0 |
| m | MULAB | X3 | X2 | X5 | 0 0 |
| m | MULAB | X5 | X2 | X7 | 0 0 |

C. Computation of sin x -continued

| | | | | | | |
|---|---|---|---|---|---|---|
| m | MULAB | X7 | X2 | X9 | 0 | 0 |
| m | MULAB | X9 | X2 | X11 | 0 | 0 |
| m | MULAB | X11 | X2 | X13 | 0 | 0 |
| a | DIVAB | X3 | 3! | X3F | 0 | 1 |
| a | DIVAB | X5 | 5! | X5F | 0 | 1 |
| a | DRVAB | X7 | 7! | X7F | 0 | 1 |
| a | DIVAB | X9 | 9! | X9F | 0 | 1 |
| a | DRVAB | X11 | 11! | X11F | 0 | 1 |
| a | DIVAB | X13 | 13! | X13F | 0 | 1 |
| a | SUBBA | X3F | X5F | X35F | 0 | 0 |
| a | SUBBA | X7F | X9F | X79F | 0 | 0 |
| a | SUBBA | X11F | X13F | X1113F | 0 | 0 |
| a | ADDAB | X35F | X79F | X3579F | 0 | 0 |
| a | ADDAB | X3579F | X1113F | ALLF | 0 | 0 |
| a | ADDAB | X | ALLF | 20000 | 0 | 0 |

D Successive Relaxation

| | | | | | | |
|---|---|---|---|---|---|---|
| a | ADDAB | B4A | I1 | I1B | 0 | 1 |
| a | ADDAB | C4A | I3 | I3C | 0 | 1 |
| a | ADDAB | I1B | I3C | AT4 | 0 | 0 |
| a | DRVAB | AT4 | 4 | A | 0 | 1 |
| a | ADDAB | A4B | I2 | I2A | 0 | 1 |
| a | ADDAB | D4B | I4 | I4D | 0 | 1 |
| a | ADDAB | I2A | I4D | BT4 | 0 | 0 |
| a | DIVAB | BT4 | 4 | B | 0 | 1 |
| a | ADDAB | A4C | I5 | I5A | 0 | 1 |
| a | ADDAB | D4C | I7 | I7D | 0 | 1 |
| a | ADDAB | I5A | I7D | CT4 | 0 | 0 |
| a | DIVAB | CT4 | 4 | C | 0 | 1 |
| a | ADDAB | C4D | I8 | I8C | 0 | 1 |
| a | ADDAB | B4D | I6 | I6B | 0 | 1 |
| a | ADDAB | I6B | I8C | DT4 | 0 | 0 |
| a | DIVAB | DT4 | 4 | D | 0 | 1 |
| a | CSUBAB | AOLD | A | NGA/DA | 0 | 0 |
| a | SUBAB | 0 | NGA | DA | 1 | 0 |
| a | CSUBAB | BOLD | B | NGB/DB | 0 | 0 |
| a | SUBAB | 0 | NGB | DB | 1 | 0 |
| a | CSUBAB | COLD | C | NGC/DC | 0 | 0 |
| a | SUBAB | 0 | NGC | DC | 1 | 0 |
| a | CSUBAB | DOLD | D | NGD/DD | 0 | 0 |
| a | SUBAB | 0 | NGD | DD | 1 | 0 |
| a | ADDAB | DA | DB | DADB | 0 | 0 |
| a | ADDAB | DC | DD | DCDD | 0 | 0 |
| a | ADDAB | DADB | DCDD | DELTA | 0 | 0 |
| a | CSUBAB | DELTA | STEP | DONE/ITER | 0 | 1 |
| m | PASSA | 20000 | DONEA | DESTA | 1 | 0 |
| m | PASSA | 20001 | DONEB | DESTB | 1 | 0 |
| m | PASSA | 20002 | DONEC | DESTC | 1 | 0 |
| m | PASSA | 20003 | DONED | DESTD | 1 | 0 |
| m | PASSA | 30000 | DONEct | DESTct | 1 | 0 |
| a | PASSA | DONE | 1.0 | DONE1/DONEa | 0 | 1 |
| a | PASSA | DONE1 | 1.0 | DONE2/DONEb | 0 | 1 |
| a | PASSA | DONE2 | 1.0 | DONE3/DONEc | 0 | 1 |
| a | PASSA | DONE3 | 1.0 | DONE4/DONEd | 0 | 1 |
| a | PASSA | DONE4 | 1.0 | DONEct | 0 | 1 |
| m | PASSA | ITER | 1.0 | ITER1/STEPa | 0 | 1 |
| m | PASSA | ITER1 | 1.0 | ITER2/STEPb | 0 | 1 |
| m | PASSA | ITER2 | 1.0 | ITER3/STEPc | 0 | 1 |
| m | PASSA | ITER3 | 1.0 | ITER4/STEPd | 0 | 1 |
| m | PASSA | ITER4 | 1.0 | STEPct | 0 | 1 |
| a | PASSA | @ANEW | STEPA | DESTA | 0 | 0 |
| a | PASSA | @BNEW | STEPB | DESTB | 0 | 0 |
| a | PASSA | @CNEW | STEPC | DESTC | 0 | 0 |
| a | PASSA | @DNEW | STEPD | DESTD | 0 | 0 |
| a | PASSA | @INCRct | STEPct | DESTct | 0 | 0 |
| a | ADDAB | INCRct | 1.0 | NEWct | 0 | 1 |
| m | ROUTA | ANEW | DESTA | 0.0 | 0 | 0 |
| m | ROUTA | BNEW | DESTB | 0.0 | 0 | 0 |
| m | ROUTA | CNEW | DESTC | 0.0 | 0 | 0 |
| m | ROUTA | DNEW | DESTD | 0.0 | 0 | 0 |
| m | ROUTA | NEWct | DESTct | 0.0 | 0 | 0 |
| a | PASSA | A | 1.0 | AOLD/AL | 0 | 1 |

D Succesive Relaxation -continued

| | | | | | | |
|---|---|---|---|---|---|---|
| m | PASSA | A1 | 1.0 | A2/A4B | 0 | 1 |
| m | PASSA | A2 | 1.0 | A4C | 0 | 1 |
| a | PASSA | B | 1.0 | BOLD/BL | 0 | 1 |
| m | PASSA | B1 | 1.0 | B2/B4A | 0 | 1 |
| m | PASSA | B2 | 1.0 | B4D | 0 | 1 |
| a | PASSA | C | 1.0 | COLD/CL | 0 | 1 |
| m | PASSA | C1 | 1.0 | C2/C4A | 0 | 1 |
| m | PASSA | C2 | 1.0 | C4D | 0 | 1 |
| a | PASSA | D | 1.0 | DOLD/D1 | 0 | 1 |
| m | PASSA | D1 | 1.0 | D2/D4B | 0 | 1 |
| m | PASSA | D2 | 1.0 | D4C | 0 | 1 |

We claim:

1. A data flow machine, comprising at least two processor elements capable of receiving an input data token and operatively interconnected to receive and transmit data tokens between them, each of said processor elements comprising:

(a) two processors operatively connected, each of said processors further comprising
control logic,
data paths operatively connecting at least one execution unit,
an input means connected to receive said input data token to a data flow memory in a one-to-one operative connection with said processor and deliver said input data token to said data flow memory, said input means of each of said processors further comprises a first input FIFO register, a second input FIFO register, and a third input FIFO register, said first input FIFO register operatively connected to receive an input data token from the data flow memory in the one-to-one operative connection with that processor, said second input FIFO register operatively connected to receive an input data token from the other processor of the same processor element, and said third input FIFO register operatively connected to receive an input data token from another processor element,
a flag checking and updating means,
a transmitting means and
an output means to output said data token, said output means connected to said execution unit and comprising a first output FIFO register, a second output FIFO register, and a third output FIFO register, (b) said data flow memory having a plurality of storage locations, each storage location having an address and a plurality of storage areas further comprising:
a parameter storage area for storing at least one parameter indicator,
an operation storage area for storing an operation indicator of an operation to be performed on at least one of said parameter indicators,
a flag storage area having a state representative of the presence of parameter indicators required by said operation, and
an output target address storage area which provides an output target address to which said output data token is directed;

wherein said input means directs an input data token having a target address and a first parameter indicator to one of said storage locations identified by said target address, and in response thereto said flag checking and updating means checks the state of the flag in the flag storage area in the identified storage location to determine if other parameter indicators required by the operation in the identified storage location are present and further updates the state of the flag in the flag storage area in the identified storage location to indicate that said first parameter indicator is present, and in response thereto said transmitting means transmits said operation indicator and those parameter indicators that are present in said identified storage location to said execution unit wherein said operation is performed and a valid output data token is generated only if all parameter indicators required by the operation are present in the identified storage location, said first output FIFO register is operatively connected to transmit an output data token to the data flow memory in the one-to-one operative connection with that processor, said second output FIFO register is operatively connected to transmit an output data token to the other processor of the same processor element, and said third output FIFO register is operatively connected to transmit an output data token to another processor element.

2. A data flow machine comprised of at least two processing elements interconnected to receive input data tokens and transmit output data tokens between them, and each of said processing elements further comprises two processors wherein each of said processors comprises control logic and data paths operatively connecting at least one execution unit, an input means, a flag checking and updating means, a transmitting means, an output means, and wherein there is a data flow memory in a one-to-one relationship with each of said processors; said input means of each of said processors further comprises a first input FIFO register, a second input FIFO register, and a third input FIFO register, said first input FIFO register operatively connected to receive an input data token from the dam flow memory in the one-to-one operative connection with that processor, said second input FIFO register operatively connected to receive an input data token from the other processor of the same processing element, and said third input FIFO register operatively connected to receive an input data token from another processing element; and said output means of each of said processors further comprises a first output FIFO register, a second output FIFO register, and a third output FIFO register, said first output FIFO register operatively connected to transmit an output data token to the data flow memory in the one-to-one operative connection with that processor, said second output FIFO register operatively connected to transmit an output data token to the other processor of the same processing element, and said third output FIFO register operatively connected to transmit an output data token to another processing element;

each said data flow memory having a plurality of storage locations, each storage location having an address and a plurality of storage areas further comprising:

a parameter storage area having a first parameter indicator storage area for storing a first parameter indicator, and a second parameter indicator storage area for storing a second parameter indicator, and an operation storage area for storing an operation indicator of an operation to be performed on one of said parameter indicators, and a flag storage area further comprising a first flag storage area and a second flag storage area for storing a first flag and a second flag, respectively, each of said flags having a state representative of the presence of said first parameter indicator and a second data parameter indicator in said first and second parameter indicator storage areas, respectively;

a sticky tag storage area further comprising a first sticky tag and a second sticky tag, said first and second sticky tag having a state to indicate that said first parameter indicator and said second data parameter indicator is always present in said first and second parameter indicator storage areas, respectively;

an output target address storage area which provides an output target address to which an output data token is directed;

wherein said input means directs a first input data token having an input target address and a parameter indicator to one of said storage locations identified by said input target address, and in response thereto said flag checking and updating means checks the state of each flag and sticky tag in the identified storage location to determine if other parameter indicators required by the operation in the identified storage location are present and further updates the state of the flags in the flag storage area in the identified storage location to indicate the parameter indicator of said first input data token is now present in the identified storage location, and in response thereto said transmitting means transmits said operation indicator and those parameter indicators that are present in said identified storage location to said execution unit wherein said operation is performed and a valid output data token is generated only if all parameter indicators required by the operation are present in the identified storage location, and if all parameter indicators required by the operation are not present in the identified storage location, then said input means directs a second input data token having said target address and a second parameter indicator to said identified storage location, and said flag checking and updating means checks said flags and said sticky tags to determine that said parameter indicator of said first input data token and said second parameter indicator is now present in said identified storage location and said transmitting means transmits said operation indicator and said parameter indicator of said first input data token and second parameter indicator to said execution unit which performs said operation upon said parameter indicators and generates an output data token.

3. A method of performing data flow processing in a data flow machine, said data flow machine comprising at least one processor element, each of which processor element further comprises a processor having control logic and data paths operatively connecting at least one execution unit an input means, a flag checking and updating means, and a transmitting means, and a data flow memory in a one-to one relationship with said processor, comprising:

(a) inputting a first input token having an input address and a first parameter indicator to a storage location identified by the input address of the first input token in a data flow memory, said data flow memory having a plurality of addressable storage locations, each storage location having a plurality of memory words associated with two parameters;

(b) storing the first parameter indicator in a first parameter memory word of the storage location in the data flow memory;

(c) checking and updating a first parameter flag word in the storage location of the data flow memory to indicate that the first parameter indicator is available;

(d) inputting a second input token having the same input address as the first token and a second parameter indicator to said identified storage location in the data flow memory;

(e) storing the second parameter indicator in a second parameter memory word of the identified storage location in the data flow memory;

(f) triggering a second parameter flag word in the storage location of the data flow memory to indicate that the second parameter indicator is available;

(g) transmitting the first and second parameter indicators, an instruction stored in an opcode memory word of the storage location, and a successor target address stored in a target address memory word of the storage location to an execution unit of a processor;

(h) executing an operation indicated by the instruction using parameters indicated by the first and second parameter indicators in the execution unit of the processor;

(i) generating an output token comprised of a target address and a resultant parameter indicator which embodies a result of said operation;

(j) transmitting the output token to the target address along a data path in the processor;

(k) resetting the first and second parameter flag word in the storage location to indicate that the first and second parameters are no longer available in said storage location of said data flow memory.

4. The method of performing data flow processing, as in claim 3, further comprising:

presetting at least one sticky tag memory word in the said identified storage location in the data flow memory indicating that at least one parameter indicator is always available;

storing in one of said parameter memory words an address in a data flow memory where a value of said parameter indicator is located;

retrieving the value of said parameter indicator from the data flow memory as indicated by the address stored in said parameter memory word, and when all parameter indicators required by said operation are available, process the data as in steps g–k of claim 3.

* * * * *